(12) United States Patent
Huang et al.

(10) Patent No.: US 9,854,406 B2
(45) Date of Patent: Dec. 26, 2017

(54) CONTROL METHOD AND CONTROLLER

(71) Applicant: Lenovo (Beijing) Co., Ltd., Beijing (CN)

(72) Inventors: Longhai Huang, Beijing (CN); Mingyong Lu, Beijing (CN); Jinqiang Lin, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 148 days.

(21) Appl. No.: 14/637,555

(22) Filed: Mar. 4, 2015

(65) Prior Publication Data
US 2016/0088640 A1    Mar. 24, 2016

(30) Foreign Application Priority Data

Sep. 22, 2014  (CN) .......................... 2014 1 0485924
Sep. 22, 2014  (CN) .......................... 2014 1 0485946
Sep. 25, 2014  (CN) .......................... 2014 1 0499322

(51) Int. Cl.
*H04W 4/00*     (2009.01)
*H04W 4/02*     (2009.01)
*H04W 72/04*    (2009.01)
*H04W 36/00*    (2009.01)
*H04W 76/02*    (2009.01)
*H04W 84/12*    (2009.01)

(52) U.S. Cl.
CPC ....... *H04W 4/028* (2013.01); *H04W 36/0088* (2013.01); *H04W 72/0453* (2013.01); *H04W 76/027* (2013.01); *H04W 84/12* (2013.01)

(58) Field of Classification Search
None
See application file for complete search history.

(56) References Cited

U.S. PATENT DOCUMENTS 8,090,395 B2    1/2012  Ngai et al.
8,630,220 B2    1/2014  Umeuchi et al.
(Continued)

FOREIGN PATENT DOCUMENTS

CN    101005582 A    7/2007
CN    101820689 A    9/2010
(Continued)

OTHER PUBLICATIONS

First Chinese Office Action regarding Application No. 201410485924.5 dated Apr. 10, 2017. English translation provided by Unitalen Attorneys at Law.
(Continued)

*Primary Examiner* — Edan Orgad
*Assistant Examiner* — Rebecca Song
(74) *Attorney, Agent, or Firm* — Harness, Dickey & Pierce, P.L.C.

(57) ABSTRACT

A control method and a controller are provided. The method includes: controlling an electronic device to connect to a wireless access point corresponding to a first channel based on a first preset rule; controlling the electronic device to connect to a wireless access point corresponding to the first channel or a wireless access point corresponding to a second channel based on a second preset rule; where the first preset rule is different from the second preset rule, and the frequency of the first channel is higher than the frequency of the second channel.

26 Claims, 19 Drawing Sheets

(56) References Cited

U.S. PATENT DOCUMENTS

| | | |
|---|---|---|
| 9,319,954 B2 | 4/2016 | Zhuang et al. |
| 2008/0076420 A1 | 3/2008 | Khetawat et al. |
| 2010/0234021 A1 | 9/2010 | Ngai et al. |
| 2010/0303051 A1 | 12/2010 | Umeuchi et al. |
| 2012/0230213 A1* | 9/2012 | Shin ................. H04L 5/001 370/252 |
| 2013/0107116 A1 | 5/2013 | Charbit et al. |
| 2013/0183976 A1 | 7/2013 | Zhuang et al. |
| 2015/0250014 A1* | 9/2015 | Qiu ................. H04W 76/023 370/329 |
| 2015/0257022 A1* | 9/2015 | Kohlmann ......... H04W 24/08 455/550.1 |
| 2015/0382348 A1* | 12/2015 | Hara ............... H04W 72/0453 370/329 |
| 2016/0014664 A1* | 1/2016 | Singh ................ H04W 36/14 370/332 |
| 2016/0198401 A1 | 7/2016 | Zhuang et al. |

FOREIGN PATENT DOCUMENTS

| | | | |
|---|---|---|---|
| CN | 101946543 A | 1/2011 | |
| CN | 102186179 A | 9/2011 | |
| CN | 102349334 A | 2/2012 | |
| CN | 102497638 A | 6/2012 | |
| CN | 102625389 A | 8/2012 | |
| CN | 103686938 A | 3/2014 | |
| CN | 103731881 A | 4/2014 | |
| KR | 20140025913 A | 3/2014 | |
| WO | WO 2011094284 A1 * | 8/2011 | ........... H04B 7/0871 |

OTHER PUBLICATIONS

First Chinese Office Action regarding Application No. 201410499322.5 dated Apr. 1, 2017. English translation provided by Unitalen Attorneys at Law.

First Chinese Office Action regarding Application No. 201410485946.1 dated Mar. 22, 2017. English translation provided by Unitalen Attorneys at Law.

* cited by examiner

CONTROL METHOD AND CONTROLLER

The present application claims the priority to Chinese Patent disclosure No. 201410485924.5, entitled as "CONTROL METHOD, CONTROLLER, AND ELECTRONIC DEVICE", filed on Sep. 22, 2014 with State Intellectual Property Office of People's Republic of China, which is incorporated herein by reference in its entirety.

The present application claims the priority to Chinese Patent disclosure No. 201410485946.1, entitled as "CONTROL METHOD, CONTROLLER, AND ELECTRONIC DEVICE", filed on Sep. 22, 2014 with State Intellectual Property Office of People's Republic of China, which is incorporated herein by reference in its entirety.

The present application claims the priority to Chinese Patent disclosure No. 201410499322.5, entitled as "CONTROL METHOD, CONTROLLER, AND ELECTRONIC DEVICE", filed on Sep. 25, 2014 with State Intellectual Property Office of People's Republic of China, which is incorporated herein by reference in its entirety.

FIELD

The disclosure relates to the field of signal transmission techniques, and particularly to a control method, and a controller.

BACKGROUND

With the wide application of wireless devices, more and more users utilizes 2.4 GHz-WiFi to access the network, resulting in a slow network access speed within a frequency band of 2.4 GHz; moreover, there is a poor anti-interference performance when a signal is received, further the data transmission rate is reduced and the user's experience is impacted.

SUMMARY

The disclosure provides a control method, and a controller, for solving the technical problems that: the network access speed is slow within the frequency band of 2.4 GHz; and the data transmission rate is slow and the user's experience is impacted, and there is a poor anti-interference performance when receiving a signal.

It is provided a control method according to the disclosure. The control method includes:

controlling an electronic device to connect to a wireless access point corresponding to a first channel based on a first preset rule;

controlling the electronic device to connect to a wireless access point corresponding to the first channel or a wireless access point corresponding to a second channel based on a second preset rule;

where the first preset rule is different from the second preset rule, and the frequency of the first channel is higher than the frequency of the second channel.

It is also provided a controller according to the disclosure. The controller includes:

a first control unit, configured to control an electronic device to connect to a wireless access point corresponding to a first channel based on a first preset rule; and a second control unit, configured to control the electronic device to connect to the wireless access point corresponding to the first channel or a wireless access point corresponding to a second channel based on a second preset rule;

where the first preset rule is different from the second preset rule, and the frequency of the first channel is higher than the frequency of the second channel.

As can be seen from the above solutions, with the control method, and the controller provided by the disclosure, the network parameter of the network environment where the electronic device is located is compared with the first preset threshold after the network parameter is acquired, and the electronic device is controlled to connect to the wireless access point corresponding to the first channel if the network parameter is greater than or equal to the first threshold, or the electronic device is controlled to connect to the wireless access point corresponding to the first channel or the wireless access point corresponding to the second channel if the network parameter is smaller than the first threshold, in which the frequency of the first channel is higher than the frequency of the second channel. In the disclosure, the electronic device is flexibly controlled to connect to different wireless access points of different channels by monitoring the network parameter, to avoid a slow data transmission rate caused by a connection, established via the second channel having a lower frequency, between the electronic device and a wireless access point in the case that the network parameter is greater than the first threshold; therefore, the wireless access point corresponding to the channel having a higher frequency can be connected in the case that the network parameter is greater than the first threshold, thereby improving the data transmission rate and improving the user's experience in internet access.

As can be seen from the above solutions, according to the connection control method, and the controller as provided in the disclosure, the first channel information is acquired based on a first predetermined rule, wireless access points of the first channel is scanned to determine a first target wireless access point, and the electronic device is controlled to connect to the first target wireless access point. The first predetermined rule in the disclosure may be: firstly scanning a wireless access point of a channel to which the electronic device always connects or ever connected. In this way, a speed of scanning the wireless access point is increased and a connection speed is increased, thus a better user experience in wireless network access is obtained.

According to the above solutions, the control method, and the controller are provided by the disclosure. In the case that a target wireless access point is found by the electronic device and the number of connections to the target wireless access point reaches the limit, it is judged whether the target wireless access point is the wireless access point to which the electronic device ever connected, and the electronic device connects to the target wireless access point by different ways accordingly. That is to say, in the case that the electronic device ever connected to the target wireless access point, the first address is obtained from the historical connection information of the target wireless access point stored in the electronic device, thus the electronic device is controlled to connect to the target wireless access point via the first address; in the case that the electronic device did not ever connect to the target wireless access point, the electronic device is controlled to connect to the target wireless access point via the second address, based on the current address range allocated to the terminal by the target wireless access point, thus the electronic device may also connect to the target wireless access point in the case that the network is congested since the number of connections of the target wireless access point reaches the preset connection limit, thus the electronic device connects to the network smoothly and a user experience is improved significantly.

BRIEF DESCRIPTION OF THE DRAWINGS

In order to more clearly illustrate the technical solutions in embodiments of the disclosure or in the conventional art, in the following, accompanying drawings referred to describe the embodiments or the conventional art are introduced simply. Obviously, the accompanying drawings in the following description are just embodiments of the disclosure. For those skilled in the art, other accompanying drawings can also be obtained based on these accompanying drawings provided herein without any creative work.

DETAILED DESCRIPTION

The technical solutions in the embodiments of the disclosure will be described clearly and completely hereinafter in conjunction with the drawings in the embodiments of the disclosure. Apparently, the described embodiments are only a part of embodiments of the disclosure, rather than all embodiments. Based on the embodiments in the disclosure, all of other embodiments, made by those skilled in the art without any creative work, fall into the scope of protection of the disclosure.

In an embodiment of the disclosure a control method is provided. The method includes: controlling an electronic device to connect to a wireless access point corresponding to a first channel based on a first preset rule, or controlling the electronic device to connect to a wireless access point corresponding to the first channel or a wireless access point corresponding to a second channel based on a second preset rule, where the first preset rule is different from the second preset rule, the frequency of the first channel is higher than the frequency of the second channel.

Figure 1:
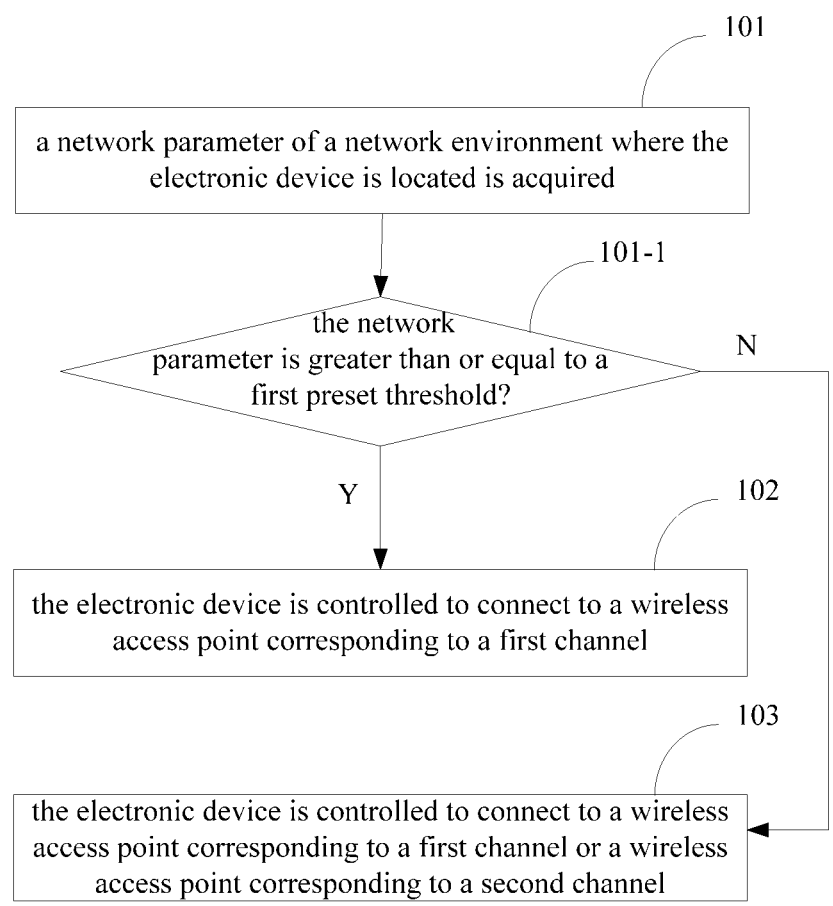
FIG. 1 is a flow chart of a control method according to an embodiment of the disclosure.

Referring to FIG. 1, a flow chart of a control method according to an embodiment of the disclosure is shown. The method in the embodiment is applied to an electronic device, to control network connections to the electronic device. The electronic device may be a device capable of performing wireless networking via WiFi, such as a cell phone, a pad or a tablet, and so on. The method may include steps 101 to 103.

In step 101, a network parameter of a network environment where the electronic device is located is acquired.

In step 101-1, it's determined whether the network parameter is greater than or equal to a first preset threshold, step 102 is performed if the network parameter is greater than or equal to a first preset threshold, or step 103 is performed if the network parameter is not greater than or equal to a first preset threshold, that is step 103 is performed if the network parameter is smaller than the first threshold.

The network parameter may be a WiFi network signal strength in the network environment where the electronic device is located. The first threshold may be set by a user as needed, for example, the first threshold may be −70 dBm. That is, in step 101, step 102 is performed if the acquired WiFi network signal strength is greater than or equal to −70 dBm, or step 103 is performed if the acquired WiFi network signal strength is smaller than −70 dBm.

In step 102, the electronic device is controlled to connect to a wireless access point corresponding to a first channel.

In step 103, the electronic device is controlled to connect to a wireless access point corresponding to a first channel or a wireless access point corresponding to a second channel.

The frequency of the first channel is higher than the frequency of the second channel. For example, the first channel may be a channel with a frequency of 5 GHz, and the second channel may be a channel with a frequency of 2.4 GHz. At present, compared with a wireless access point of the frequency of 2.4 GHz, a wireless access point of the frequency of 5 GHz may provide a much higher network access speed inside China. For example, a theoretical physical data rate of the channel with the frequency of 5 GHz may be up to 433 Mbps without multiple input and multiple output (MIMO), and a theoretical physical data rate of the channel with the frequency of 2.4 GHz may be up to only 150 Mbps without MIMO. It can be known from laboratory data that: the network access speed via the wireless access point corresponding to the channel with the frequency of 5 GHz is much higher than the network access speed via the wireless access point corresponding to the channel with the frequency of 2.4 GHz in the case that the WiFi network signal strength is greater than or equal to −70 dBm. Therefore, in the embodiment, the electronic device is preferably controlled to connect to the wireless access point corresponding to the first channel such as the channel with the frequency of 5 GHz to ensure that the user can enjoy a higher network access speed, in the case that the WiFi network signal strength is greater than or equal to −70 dBm.

As can be seen from the above solution, with the control method according to the embodiment of the disclosure, the network parameter of the network environment where the electronic device is located is compared with the first preset threshold after the network parameter is acquired, and the electronic device is controlled to connect to the wireless access point corresponding to the first channel if the network parameter is greater than or equal to the first threshold, or the electronic device is controlled to connect to the wireless access point corresponding to the first channel or the wireless access point corresponding to the second channel if the network parameter is smaller than the first threshold, in which the frequency of the first channel is higher than the frequency of the second channel. In the embodiment, the electronic device is flexibly controlled to connect to different wireless access points of different channels by monitoring the network parameter, to avoid a slower data transmission rate caused by a connection established via the second channel with a lower frequency between the electronic device and a wireless access point in the case that the network parameter is greater than the first threshold; therefore, the wireless access point corresponding to the channel with a higher frequency can be connected in the case that the network parameter is greater than the first threshold, thereby improving the data transmission rate and improving the user's experience in network access.

Figure 2:
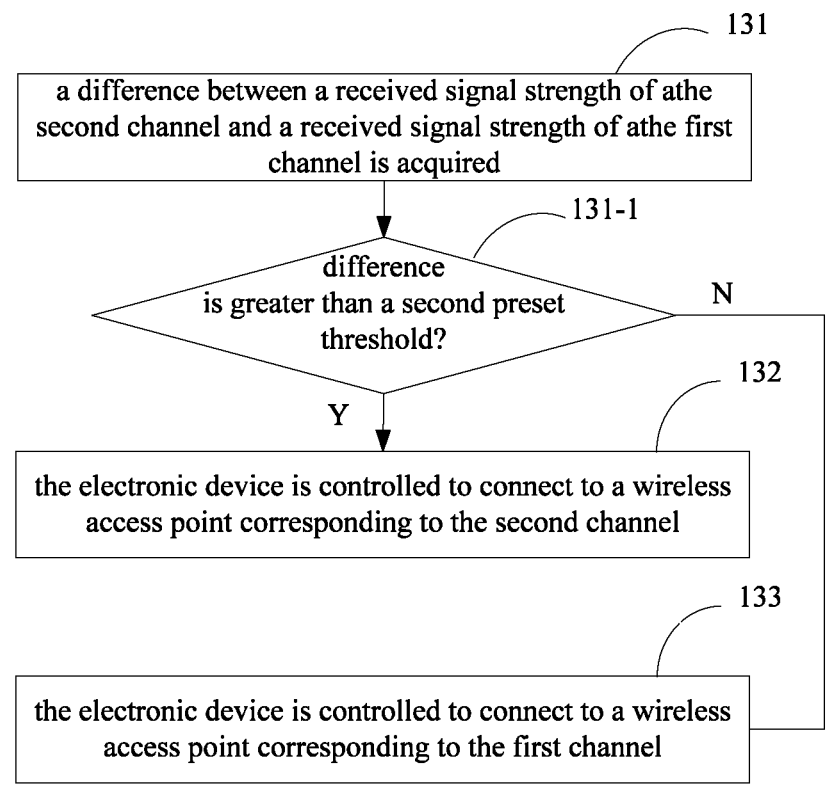
FIG. 2 is a partial flow chart of a control method according to an embodiment of the disclosure.

Referring to FIG. 2, a flow chart for implementing step 103 in the control method according to an embodiment of the disclosure is shown. Step 103 may include the following steps 131 to 133.

In step 131, a difference between a received signal strength of the second channel and a received signal strength of the first channel is acquired.

In step 131-1, it's determined whether the difference is greater than a second preset threshold, step 132 is performed if the difference is greater than a second preset threshold, or step 133 is performed if the difference is not greater than a second preset threshold, that is step 133 is performed if the difference is smaller than or equal to the second threshold.

In step 132, the electronic device is controlled to connect to a wireless access point corresponding to the second channel.

In step 133, the electronic device is controlled to connect to a wireless access point corresponding to the first channel.

The second threshold may be set by the user as required, for example, the second threshold may be set as a value of 5 dB. Compared with a signal transmitted via the wireless access point corresponding to the second channel, a signal transmitted via the wireless access point corresponding to the first channel is poorer in the connection distance and stability due to a large spatial attenuation and a high fluctuation of a weak signal. Therefore, in the embodiment, the difference obtained by subtracting the received signal strength of the first channel from the received signal strength of the second channel is compared with the second threshold, and the electronic device is preferably controlled to connect to the wireless access point corresponding to the second channel if the difference is greater than the second threshold, to ensure the stability of the network during a process that the electronic device is connected to the wireless access point.

For example, in a case that the network parameter is smaller than the first threshold, for example the WiFi network signal strength is smaller than −70 dBm, and under a condition that the received WiFi signals have the same strength, the network access speed obtained via the wireless access point corresponding to the channel with the frequency of 5 GHz is still higher than the network access speed obtained via the wireless access point corresponding to the channel with the frequency of 2.4 GHz. Therefore, in the embodiment, it is determined whether the difference between the received signal strength of the channel with the frequency of 2.4 GHz and the received signal strength of the channel with the frequency of 5 GHz is greater than 5 dB, and the electronic device is still controlled to connect to the wireless access point corresponding to the first channel if the difference obtained by subtracting the received signal strength of the channel with the frequency of 5 GHz from the received signal strength of the channel with the frequency of 2.4 GHz is less than 5 dB; or the electronic device may be preferably controlled to connect to the wireless access point corresponding to the second channel if the difference obtained by subtracting the received signal strength of the channel with the frequency of 5 GHz from the received signal strength of the channel with the frequency of 2.4 GHz is not less than 5 dB, to ensure the stability of the network access speed on the electronic device.

Figure 3:
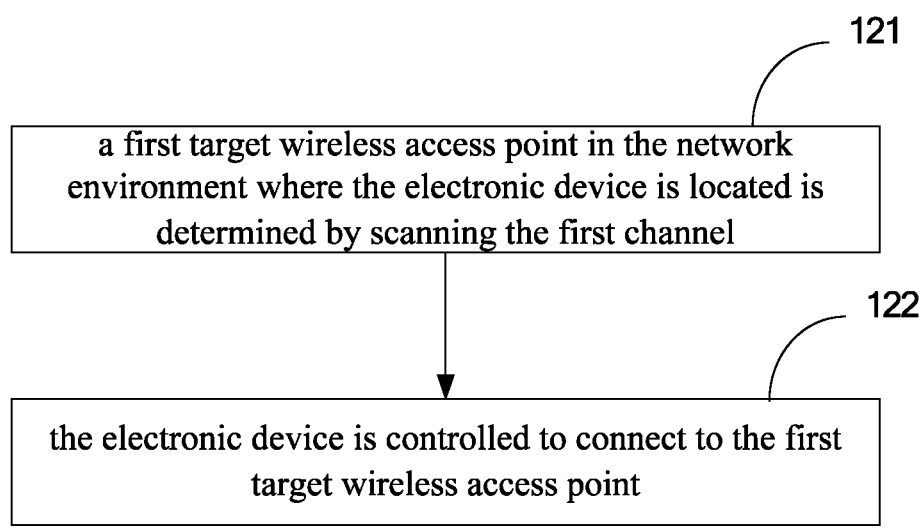
FIG. 3 is a partial flow chart of a control method according to an embodiment of the disclosure.

Referring to FIG. 3, a flow chart for implementing step 102 in the control method according to a third embodiment of the disclosure is shown. Step 102 may be implemented by the following steps 121 and 122.

In step 121, a first target wireless access point in the network environment where the electronic device is located is determined by scanning the first channel.

In step 122, the electronic device is controlled to connect to the first target wireless access point.

It should be noted that, the implementation process of step 133 may also be referred to the implementation process of step 102 as shown in FIG. 3.

Figure 4:
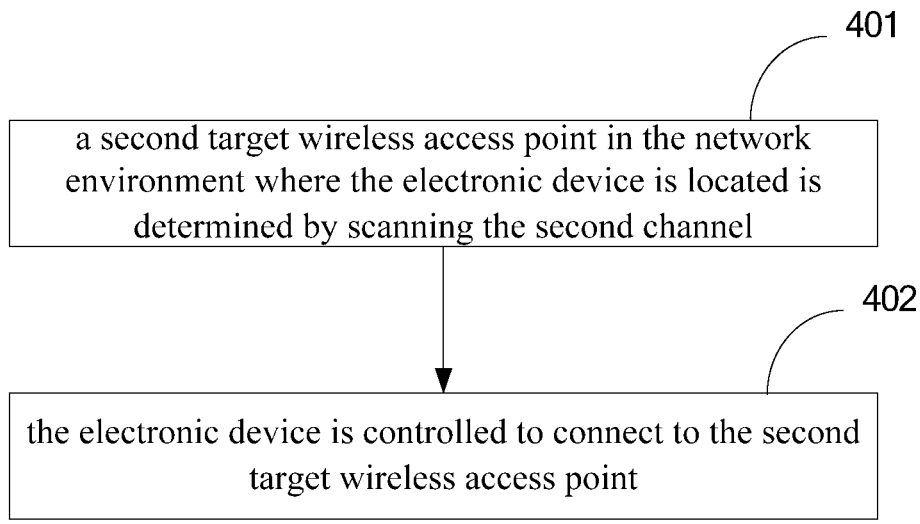
FIG. 4 is a partial flow chart of a control method according to an embodiment of the disclosure.

Referring to FIG. 4, a flow chart for implementing step 132 in the control method according to an embodiment of the disclosure is shown. Step 132 may be implemented by the following steps 401 and 402.

In step 401, a second target wireless access point in the network environment where the electronic device is located is determined by scanning the second channel.

In step 402, the electronic device is controlled to connect to the second target wireless access point.

Figure 5:
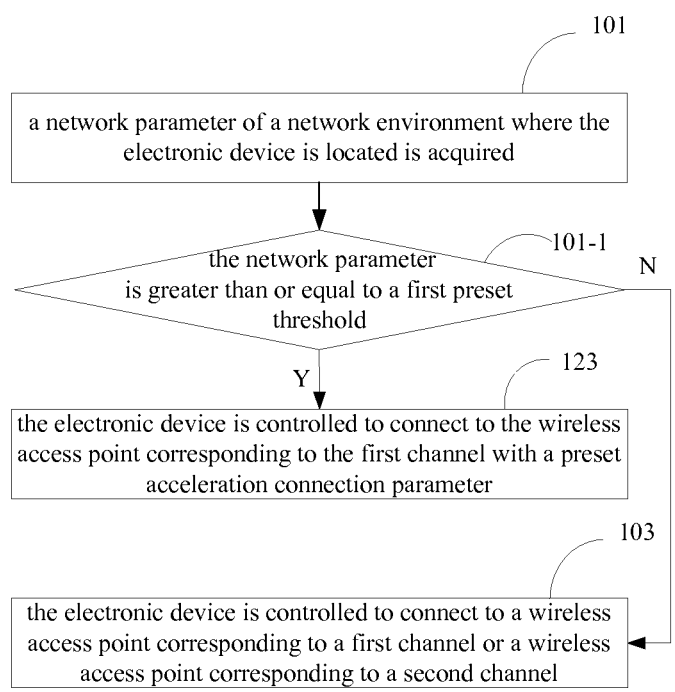
FIG. 5 is a flow chart of a control method according to an embodiment of the disclosure.

Referring to FIG. 5, a flow chart of a control method according to an embodiment of the disclosure is shown. Step 102 may be implemented by the following step 123.

In step 123, the electronic device is controlled to connect to the wireless access point corresponding to the first channel with a preset acceleration connection parameter.

The acceleration connection parameter may be a number of times that the connection is requested per second, such as 10 times per second; or the acceleration connection parameter may also be an interval for requesting the connection, for example, one connection is requested every 100 ms.

Step 123 may be implemented in the following way: once a wireless access point on the first channel is scanned, a connection request is sent to the scanned wireless access point at a frequency of 10 times per second, to accelerate the connection between the electronic device and the scanned wireless access point; alternatively, a connection request is sent to the scanned wireless access point every 100 ms, to accelerate the connection between the electronic device and the scanned wireless access point. Compared with the interval for requesting the connection of 512 ms in the conventional technical solution, the speed at which the electronic device is connected to the scanned wireless access point is significantly improved in the embodiment.

In the embodiment, the electronic device may also be controlled to connect to the wireless access point corresponding to the second channel with the acceleration connection parameter.

A controller is provided in an embodiment of the present disclosure, which includes: a first control unit, configured to control an electronic device to connect to a wireless access point corresponding to a first channel based on a first preset rule; a second control unit, configured to control the electronic device to connect to a wireless access point corresponding to the first channel or a wireless access point corresponding to a second channel, where the first preset rule is different from the second preset rule, the frequency of the first channel is higher than the frequency of the second channel.

Figure 6:
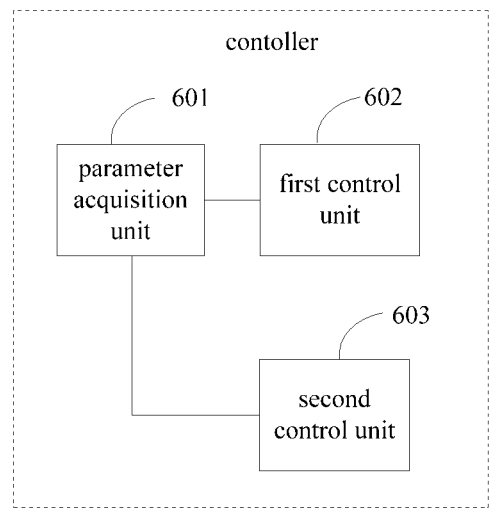
FIG. 6 is a schematic structural diagram of a controller according to an embodiment of the disclosure.

Referring to FIG. 6, a schematic structural diagram of a controller according to an embodiment of the disclosure is shown. The controller is arranged in an electronic device, to control network connections to the electronic device. The electronic device may be a device capable of connecting the wireless network via WiFi, such as a cell phone, a pad or a tablet an so on. The controller in the embodiment may include a parameter acquisition unit 601, a first control unit 602 and a second control unit 603.

The parameter acquisition unit 601 is configured to acquire a network parameter of a network environment where the electronic device is located, and trigger the first control unit 602 if the network parameter is greater than or equal to a first preset threshold, or trigger the second control unit 603 if the network parameter is smaller than the first threshold.

The network parameter may be a WiFi network signal strength in the network environment where the electronic device is located. The first threshold may be set by a user as required, for example, the first threshold may be −70 dBm. That is, the parameter acquisition unit 601 triggers the first control unit 602 if the acquired WiFi network signal strength is greater than or equal to −70 dBm, or triggers the second control unit 603 if the acquired WiFi network signal strength is smaller than −70 dBm.

The first control unit 602 is configured to control the electronic device to connect to a wireless access point corresponding to a first channel.

The second control unit 603 is configured to control the electronic device to connect to the wireless access point corresponding to the first channel or a wireless access point corresponding to a second channel.

The frequency of the first channel is higher than the frequency of the second channel. For example, the first channel may be a channel with a frequency of 5 GHz, and the second channel may be a channel with a frequency of 2.4 GHz. At present, compared with a wireless access point of the frequency of 2.4 GHz, a wireless access point of the frequency of 5 GHz may provide a much higher network access speed inside China. For example, a theoretical physical data rate of the channel with the frequency of 5 GHz may be up to 433 Mbps without MIMO, and a theoretical physical data rate of the channel with the frequency of 2.4 GHz may be up to only 150 Mbps (without MIMO). It can be known from laboratory data that: the network access speed via the wireless access point corresponding to the channel with the frequency of 5 GHz is much higher than the network access speed via the wireless access point corresponding to the channel with the frequency of 2.4 GHz in the case that the WiFi network signal strength is greater than or equal to −70 dBm. Therefore, in the embodiment, the electronic device is preferably controlled to connect to the wireless access point corresponding to the first channel such as the channel with the frequency of 5 GHz to ensure that the user can enjoy a higher network access speed, in the case that the WiFi network signal strength is greater than or equal to −70 dBm.

As can be seen from the above solution, with the controller according to the embodiment of the disclosure, the network parameter of the network environment where the electronic device is located is compared with the first preset threshold after the network parameter is acquired, and the electronic device is controlled to connect to the wireless access point corresponding to the first channel if the network parameter is greater than or equal to the first threshold, or the electronic device is controlled to connect to the wireless access point corresponding to the first channel or the wireless access point corresponding to the second channel if the network parameter is smaller than the first threshold, in which the frequency of the first channel is higher than the frequency of the second channel. In the embodiment, the electronic device is flexibly controlled to connect to different wireless access points of different channels by monitoring the network parameter, to avoid a slower data transmission rate caused by a connection established via the second channel with a lower frequency, between the electronic device and a wireless access point in the case that the network parameter is greater than the first threshold; therefore, the wireless access point corresponding to the channel with a higher frequency can be connected in the case that the network parameter is greater than the first threshold, thereby improving the data transmission rate and improving the user's experience in network access.

Figure 7:
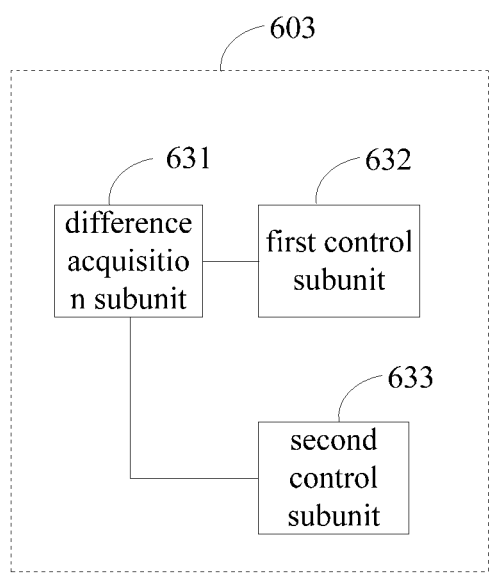
FIG. 7 is a schematic diagram showing a partial structure of a controller according to an embodiment of the disclosure.

Referring to FIG. 7, a schematic structural diagram of the second control unit 603 in the controller according to an embodiment of the disclosure is shown. The second control unit 603 may include a difference acquisition subunit 631, a first control subunit 632 and a second control subunit 633.

The difference acquisition subunit 631 is configured to acquire a difference between a received signal strength of the second channel and a received signal strength of the first channel, and trigger the first control subunit 632 if the difference is greater than a second preset threshold, or trigger the second control subunit 633 if the difference is smaller than or equal to the second threshold.

The first control subunit 632 is configured to control the electronic device to connect to the wireless access point corresponding to the second channel.

The second control subunit 633 is configured to control the electronic device to connect to the wireless access point corresponding to the first channel.

The second threshold may be set by the user as required, for example, the second threshold may be set as a value of 5 dB. Compared with a signal transmitted via the wireless access point corresponding to the second channel, a signal transmitted via the wireless access point corresponding to the first channel is poorer in the connection distance and stability due to a large spatial attenuation and a high fluctuation of a weak signal. Therefore, in the embodiment, the difference obtained by subtracting the received signal strength of the first channel from the received signal strength of the second channel is compared with the second threshold, and the electronic device is preferably controlled to connect to the wireless access point corresponding to the second channel if the difference is greater than the second threshold, to ensure the stability of the network during a process that the electronic device is connected to the wireless access point.

For example, in a case that the network parameter is smaller than the first threshold, for example the WiFi network signal strength is smaller than −70 dBm, and under a condition that the received WiFi signals have the same strength, the network access speed obtained via the wireless access point corresponding to the channel with the frequency of 5 GHz is still higher than the network access speed obtained via the wireless access point corresponding to the channel with the frequency of 2.4 GHz. Therefore, in the embodiment, it is determined whether the difference between the received signal strength of the channel with the frequency of 2.4 GHz and the received signal strength of the channel with the frequency of 5 GHz is greater than 5 dB, and the electronic device is still controlled to connect to the wireless access point corresponding to the first channel if the difference obtained by subtracting the received signal strength of the channel with the frequency of 5 GHz from the received signal strength of the channel with the frequency of 2.4 GHz is less than 5 dB; or the electronic device may be preferably controlled to connect to the wireless access point corresponding to the second channel if the difference obtained by subtracting the received signal strength of the channel with the frequency of 5 GHz from the received signal strength of the channel with the frequency of 2.4 GHz is not less than 5 dB, to ensure the stability of the network access speed on the electronic device.

Figure 8:
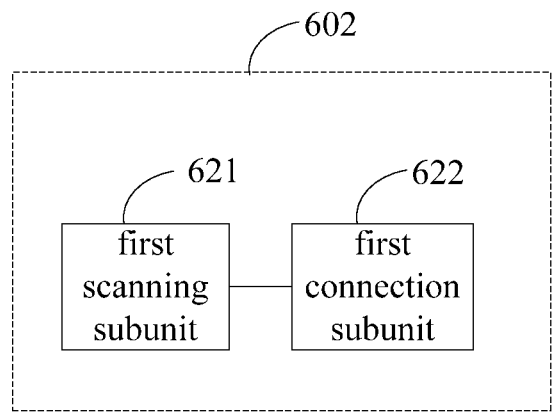
FIG. 8 is a schematic diagram showing a partial structure of a controller according to an embodiment of the disclosure.

Referring to FIG. 8, a schematic structural diagram of the first control unit 602 in the controller according to an embodiment of the disclosure is shown. The first control unit 602 may include a first scanning subunit 621 and a first connection subunit 622.

The first scanning subunit 621 is configured to determine a first target wireless access point in the network environment where the electronic device is located by scanning the first channel.

The first connection subunit 622 is configured to control the electronic device to connect to the first target wireless access point.

It should be noted that, the implementation structure of the second control subunit 633 described in the embodiment may also be referred to the implementation structure of the first control unit 602 as shown in FIG. 8.

Figure 9:
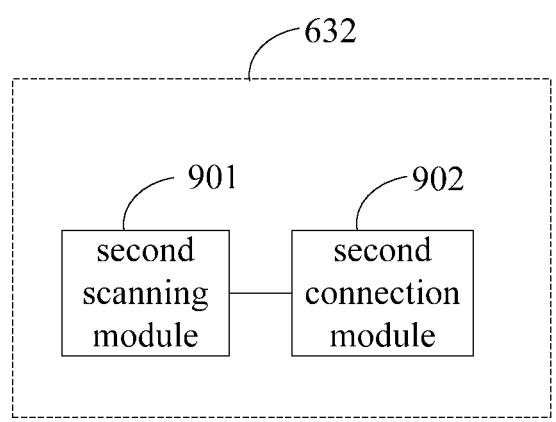
FIG. 9 is a schematic diagram showing a partial structure of a controller according to an embodiment of the disclosure.

Referring to FIG. 9, a schematic structural diagram of the first control subunit 632 in the controller according to an embodiment of the disclosure is shown. The first control subunit 632 may include a second scanning module 901 and a second connection module 902.

The second scanning module 901 is configured to determine a second target wireless access point in the network environment where the electronic device is located by scanning the second channel.

The second connection module 902 is configured to control the electronic device to connect to the second target wireless access point.

Figure 10:
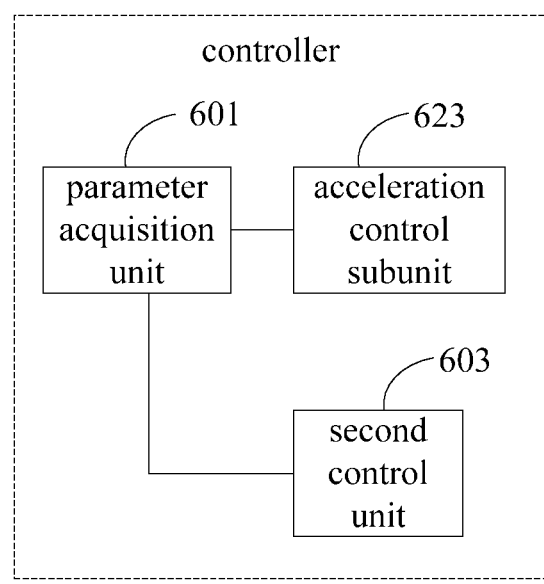
FIG. 10 is a schematic structural diagram of a controller according to an embodiment of the disclosure.

Referring to FIG. 10, a schematic structural diagram of a controller according to an embodiment of the disclosure is shown. The first control unit 602 may be implement by:

an acceleration control subunit 623, configured to control the electric device to connect to the wireless access point corresponding to the first channel with a preset acceleration connection parameter.

The acceleration connection parameter may be a number of times that the connection is requested per second, such as 10 times per second; or the acceleration connection parameter may also be an interval for requesting the connection, for example, one connection is requested every 100 ms.

The acceleration control subunit 623 may be implemented in the following way:

once a wireless access point on the first channel is scanned, a connection request is sent to the scanned wireless access point at a frequency of 10 times per second, to accelerate the connection between the electronic device and the scanned wireless access point; alternatively, a connection request is sent to the scanned wireless access point every 100 ms, to accelerate the connection between the electronic device and the scanned wireless access point. Compared with the interval for requesting the connection of 512 ms in the conventional technical solution, the speed at which the electronic device is connected to the scanned wireless access point is significantly improved in the embodiment.

In the embodiment, the electronic device may also be controlled to connect to the wireless access point corresponding to the second channel with the acceleration connection parameter.

An electronic device is further provided according to an embodiment of the disclosure. The electronic device may be a device capable of connecting the wireless network via WiFi, for example, a cell phone, a pad or a tablet and so on. The controller described according to any one of the above embodiments is further arranged in the electronic device.

The controller is configured to acquire a network parameter of a network environment where the electronic device is located, and control the electronic device to connect to a wireless access point corresponding to a first channel if the network parameter is greater than or equal to a first preset threshold, or control the electronic device to connect to a wireless access point corresponding to a first channel or a wireless access point corresponding to a second channel if the network parameter is smaller than the first threshold.

The frequency of the first channel is higher than the frequency of the second channel.

The controller controlling the electronic device to connect to a wireless access point corresponding to a first channel or a wireless access point corresponding to a second channel may be implemented by:

acquiring a difference between a received signal strength of the second channel and a received signal strength of the first channel, and controlling the electronic device to connect to a wireless access point corresponding to the second channel if the difference is greater than a second preset threshold, or controlling the electronic device to connect to a wireless access point corresponding to the first channel if the difference is smaller than or equal to the second threshold.

The controller controlling the electronic device to connect to the wireless access point corresponding to the first channel may be implemented by:

determining a first target wireless access point in the network environment where the electronic device is located by scanning the first channel; and controlling the electronic device to connect to the first target wireless access point.

The controller controlling the electronic device to connect to the wireless access point corresponding to the second channel may be implemented by:

determining a second target wireless access point in the network environment where the electronic device is located by scanning the second channel; and controlling the electronic device to connect to the second target wireless access point.

It should be noted that, the controller controlling the electronic device to connect to the wireless access point corresponding to the first channel or the wireless access point corresponding to the second channel may be implemented by:

controlling the electronic device to connect to the wireless access point corresponding to the first channel or the wireless access point corresponding to the second channel with the preset acceleration connection parameter.

Figure 11:
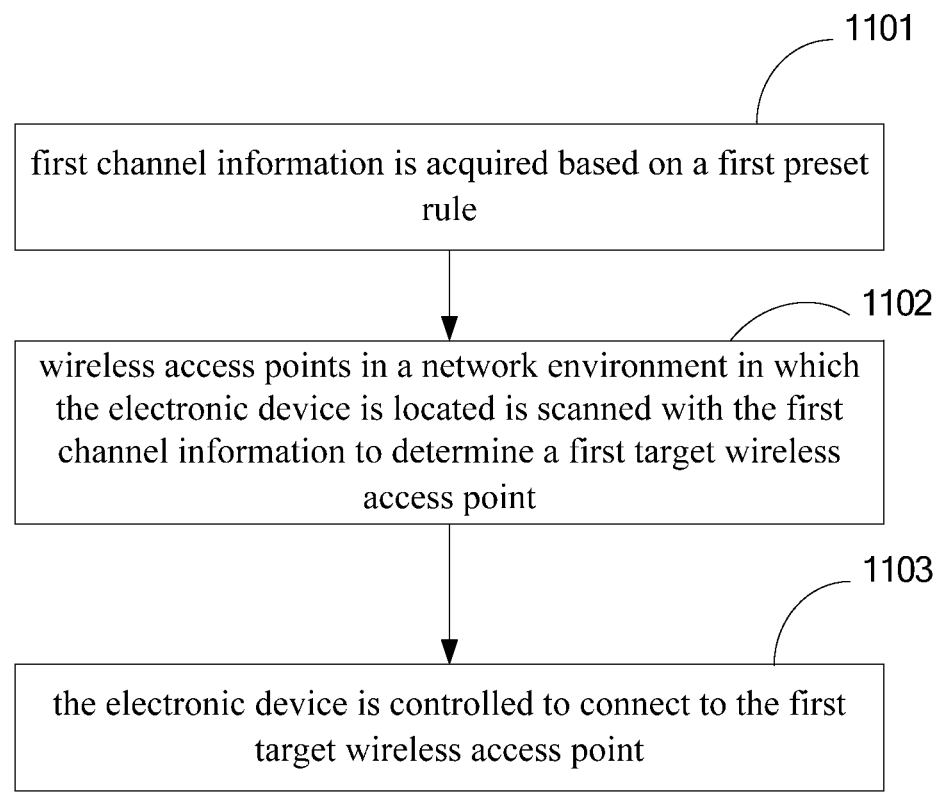
FIG. 11 is a flow chart of a control method according to an embodiment of the disclosure.

Reference is made to FIG. 11, which is a flow chart of a control method according to an embodiment of the disclosure. The control method according to the embodiment is applied in an electronic device. The electronic device may be a terminal with a WiFi connection function, such as a mobile phone, a pad tablet PC or the like.

The control method according to the embodiment may include step 1101 to step 1103 to improve the speed of the electronic device connecting to a wireless access point, and to provide a better user experience in wireless network access.

In step 1101, first channel information is acquired based on a first preset rule.

The first preset rule may be preset by a user. The first preset rule may be: channel information about a channel the user wants to firstly scan, such as the channel information about the channel to which the electronic device always connects in an administrative area in which the electronic device is located, or the channel information about a WiFi channel to which the electronic device ever connected.

In step 1102, wireless access points in a network environment in which the electronic device is located is scanned with the first channel information to determine a first target wireless access point.

The first target wireless access point is the WiFi network access point of the channel corresponding to the first channel information.

In step 1103, the electronic device is controlled to connect to the first target wireless access point.

The first preset rule may be: firstly scanning the channel the user wants to firstly scan, such as the channel to which the electronic device always connects or ever connected. Compared with the conventional art in which the electronic device scans the wireless access point of the channel with the frequency of 2.4 GHz, the wireless access point of the channel with the frequency of 5 GHz and the wireless access points of other channels in the network environment in a fixed order, and then the electronic device automatically connects to the wireless access point or connects to the wireless access point by receiving a login password input by the user, in the control method according to the embodiment, the wireless access point of the channel determined based on the first preset rule is scanned firstly, a speed of scanning the wireless access point is increased significantly, and a speed of the electronic device connecting to the wireless access point is increased.

As can be seen from the solutions, in the control method according to the embodiment of the disclosure, the first channel information is acquired based on a first preset rule, wireless access points of the first channel is scanned to determine the first target wireless access point, and the electronic device is controlled to connect to the first target wireless access point. The first preset rule in the embodiment may be: firstly scanning a wireless access point of a channel to which the electronic device always connects or ever connected. In this way, a speed of scanning wireless access points is increased and a connection speed is increased, thus a better user experience in wireless network access is obtained.

Figure 12:
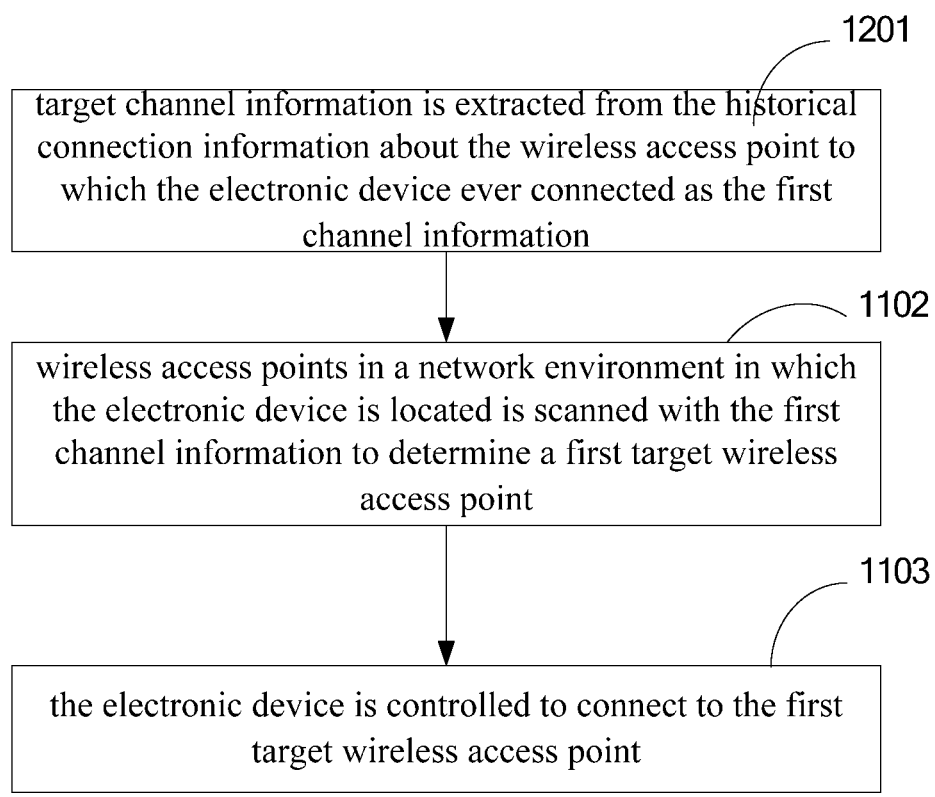
FIG. 12 is a flow chart of a control method according to an embodiment of the disclosure.

It should be noted that historical connection information about the wireless access point to which the electronic device ever connected may be stored in the electronic device. The historical connection information includes the channel information about the channel the wireless access point of which is connected to the electronic device, connection time, a login user name and a login password or the like. In this case, the first preset rule may include: acquiring the first channel information based on the historical connection information. Reference is made to FIG. 12, which is a flow chart of a control method according to an embodiment of the disclosure. Step 1101 may include step 1201.

In step 1201, target channel information is extracted from the historical connection information about the wireless access point to which the electronic device ever connected as the first channel information.

In the control method according to the embodiment, the wireless access point of the channel to which the electronic device ever connected is firstly scanned, and then the wireless access point to which the electronic device ever connected is found. In this way, the electronic device may quickly connect to the wireless network in the case that the wireless access point of the channel is available. A connection speed is increased significantly, thus a better user experience in wireless network access is obtained.

Figure 13:
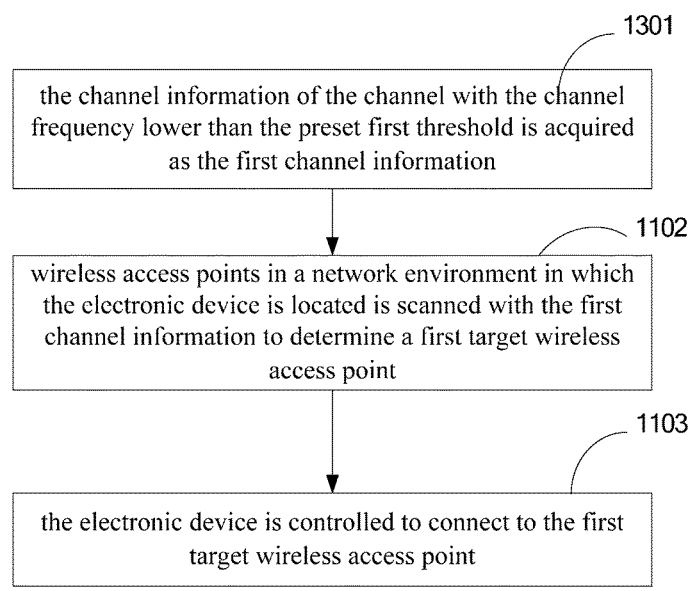
FIG. 13 is a flow chart of a control method according to an embodiment of the disclosure.

In addition, the first preset rule may also include: acquiring channel information of a channel with a channel frequency lower than a preset first threshold. Reference is made to FIG. 13, which is a flow chart of a control method according to an embodiment of the disclosure. Step 1101 may include step 1301.

In step 1301, the channel information of the channel with the channel frequency lower than the preset first threshold is acquired as the first channel information.

For example, the first threshold may be set to be 3 GHz. In this case, in the existing communication network, the channel information of the channel with the frequency of 2.4 GHz is acquired as the first channel information. In the control method according to the embodiment, the wireless access points of the channel with the frequency of 2.4 GHz is firstly scanned, and then the wireless access point of the channel with the frequency of 2.4 GHz is found. In this way, the electronic device may quickly connect to the wireless network in the case that the wireless access point of the channel is available. A connection speed is increased significantly, and a better user experience in wireless network access is obtained.

As another example, the first threshold may be set to be 6 GHz. In this case, in the existing communication network, the channel information of the channel with the frequency of 2.4 GHz and the channel with the frequency of 5 GHz is acquired as the first channel information. In the control method according to the embodiment, the wireless access points of the channel with the frequency of 2.4 GHz and the channel with the frequency of 5 GHz are firstly scanned, and then the wireless access points of the channel with the frequency of 2.4 GHz and the channel with the frequency of 5 GHz are found.

In this way, the electronic device may quickly connect to the wireless network in the case that the found wireless access points are available. The connection speed is increased significantly, and a better user experience in wireless network access is obtained.

Figure 14:
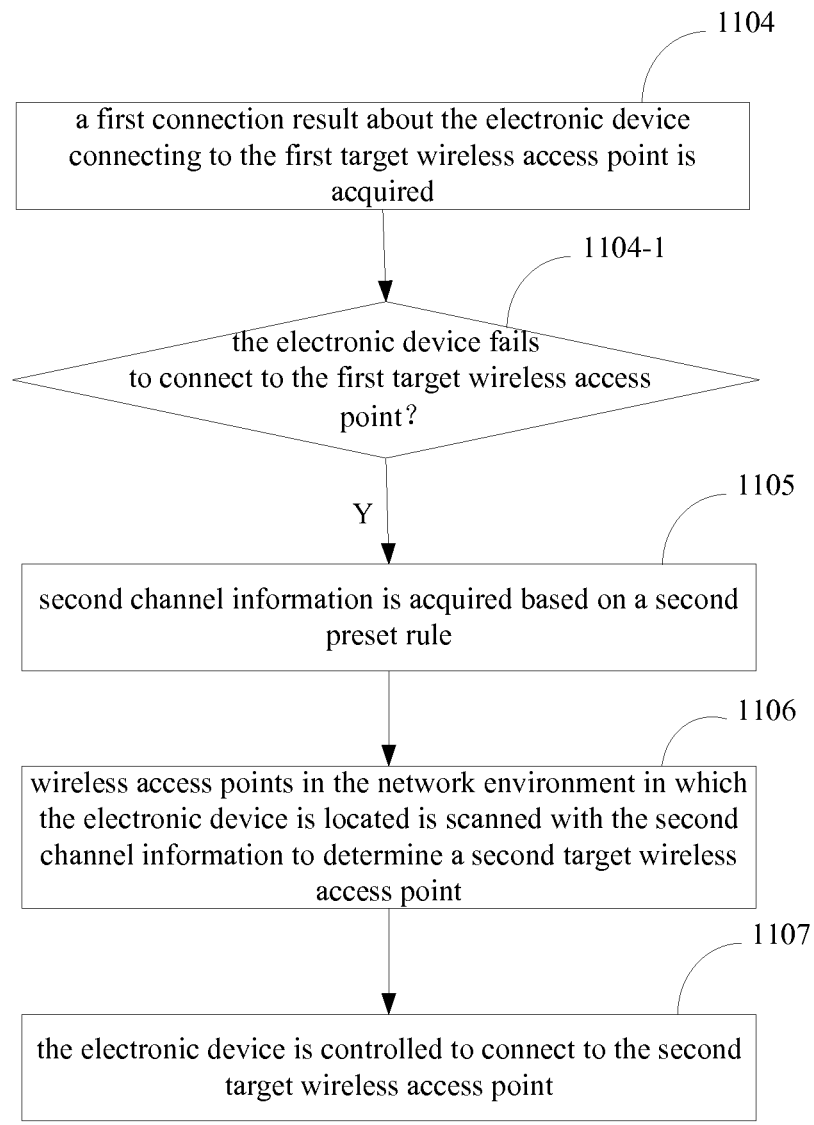
FIG. 14 is a partial flow chart of a control method according to an embodiment of the disclosure.

Reference is made to FIG. 14, which is a partial flow chart of a control method according to an embodiment of the disclosure. The control method may further include step 1104 to step 1107 performed after step 1103.

In step 1104, a first connection result about the electronic device connecting to the first target wireless access point is acquired.

In step 1104-1, it's determined whether the first connection result indicates that the electronic device fails to connect to the first target wireless access point, step 1105 is performed if the first connection result indicates that the electronic device fails to connect to the first target wireless access point.

In step 1105, second channel information is acquired based on a second preset rule.

The second preset rule is different from the first preset rule. And the second preset rule is relative to the first preset rule. For example, in the case that the first preset rule is: acquiring the first channel information based on the historical connection information, the second preset rule is: acquiring the channel information other than the channel information about the channel corresponding to the historical connection information. In the case that the first preset rule is: acquiring the channel information about the channel with the channel frequency lower than the preset first threshold, the second preset rule is: acquiring channel information other than the channel information about channels with the channel frequency lower than the preset first threshold. The second channel information acquired in step 1105 is the channel information other than the first channel information acquired based on the first preset rule.

In step 1106, wireless access points in the network environment in which the electronic device is located is scanned with the second channel information to determine a second target wireless access point.

In the control method according to the embodiment, the wireless access points other than the wireless access point found with the first channel information may be scanned with the second channel information in the case that the electronic device fails to connect to the first target wireless access point found with the first channel information, and the second target wireless access point is found.

In step 1107, the electronic device is controlled to connect to the second target wireless access point.

In the control method according to the embodiment, the electronic device firstly scans and connects to the wireless access point of the channel determined based on the first preset rule. The electronic device then scans and connects to the wireless access point of the channel determined based on the second preset rule in the case that the electronic device fails to connect to the wireless access point of the channel determined based on the first preset rule. In this way, the effectiveness of the electronic device connecting to the network is ensured, and the speed of the electronic device connecting to the network is increased. For example, in the control method according to the embodiment, the electronic device firstly scans and connects to the wireless access point of the channel to which the electronic device ever connected.

The electronic device then scans the wireless access points of the channel, such as the domestic commonly used channel with the frequency of 2.4 GHz and the channel with the frequency of 5 GHz, other than the channel to which the electronic device ever connected in the case that the electronic device fails to connect to the wireless access point of the channel to which the electronic device ever connected. In this case, the electronic device may firstly scan the wireless access point of the channel with the frequency of 2.4 GHz, and then scan the wireless access point of the channel with the frequency of 5 GHz. Alternatively, the electronic device may simultaneously scan the wireless access points of the channel with the frequency of 2.4 GHz and the channel with the frequency of 5 GHz. In this way, the speed of scanning and connecting to the WiFi of the electronic device is increased, and a better user experience in wireless network access is obtained.

Figure 15:
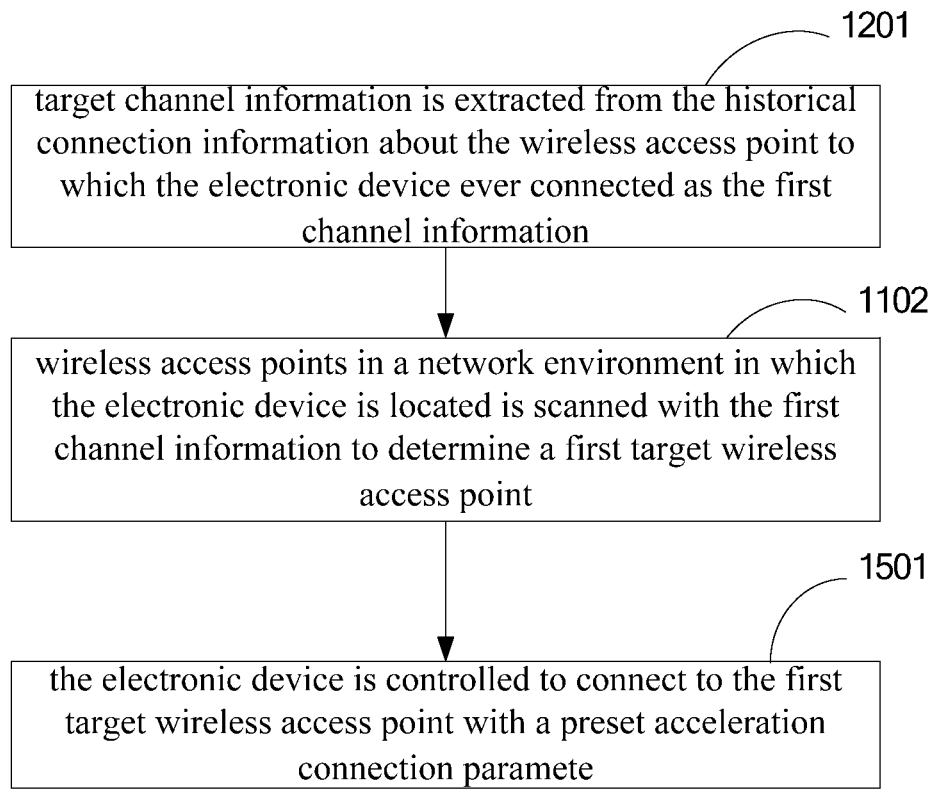
FIG. 15 is a flow chart of a control method according to an embodiment of the disclosure.

Reference is made to FIG. 15, which is a flow chart of a control method according to an embodiment of the disclosure. Step 1103 may include step 1501.

In step 1501, the electronic device is controlled to connect to the first target wireless access point with a preset acceleration connection parameter.

The acceleration connection parameter may be a number of times that the connection is requested per second, for example, 10 times per second or the acceleration connection parameter may also be an interval for requesting the connection, for example, one connection is requested every 100 ms.

Step 1501 may be implemented as follows.

Once the first target wireless access point is found, a connection request is sent to the first target wireless access point at a frequency of 10 times per second in order to accelerate the connection between the electronic device and the first target wireless access point. Alternatively, a connection request is sent to the first target wireless access point every other 100 ms, to accelerate the connection between the electronic device and the first target wireless access point. Compared with the interval for requesting the connection of 512 ms in the conventional technical solution, the speed at which the electronic device is connected to the scanned wireless access point in the embodiment is significantly improved.

In step 1107, the electronic device may also be controlled to connect to the second target wireless access point with the acceleration connection parameter.

Figure 16:
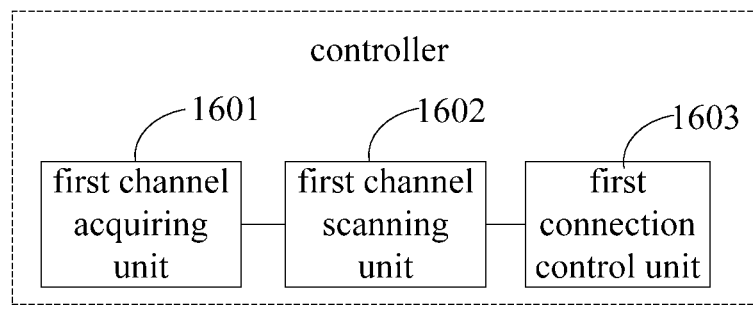
FIG. 16 is a schematic structural diagram of a controller according to an embodiment of the disclosure.

Reference is made to FIG. 16, which is a schematic structural diagram of a controller according to an embodiment of the disclosure. The controller according to the embodiment is provided in an electronic device. The electronic device may be a terminal with a WiFi connection function, such as a mobile phone, a pad tablet PC or the like.

The controller according to the embodiment may include a first channel acquiring unit 1601, a first channel scanning unit 1602 and a first connection control unit 1603. The controller is used to control the WiFi connection of the electronic device. A speed of the electronic device connecting a wireless access point is increased, and a better user experience in wireless network access is obtained.

The first channel acquiring unit 1601 is configured to acquire first channel information based on a first preset rule.

The first preset rule may be preset by a user. The first preset rule may be: channel information about a channel the user wants to firstly scan, such as the channel information about the channel to which the electronic device always connects in an administrative area in which the electronic device is located, or the channel information about a WiFi channel to which the electronic device ever connected.

The first channel scanning unit 1602 is configured to scan a wireless access point in a network environment in which the electronic device is located with the first channel information to determine a first target wireless access point.

The first target wireless access point is the WiFi network access point of the channel corresponding to the first channel information.

The first connection control unit 1603 is configured to control the electronic device to connect to the first target wireless access point.

The first preset rule may be: firstly scanning the channel the user wants to firstly scan, such as the channel to which the electronic device always connects or ever connected. Compared with the conventional art in which the electronic device scans the wireless access point of the channel with the frequency of 2.4 GHz, the wireless access point of the channel with the frequency of 5 GHz and the wireless access points of other channels in the network environment in a fixed order, and then the electronic device automatically connects to the wireless access point or connects to the wireless access point by receiving a login password input by the user, in the controller according to the embodiment, the wireless access point of the channel determined based on the first preset rule is scanned firstly, a speed of scanning the wireless access point is increased significantly, and a speed of the electronic device connecting the wireless access point is increased.

As can be seen from the above solutions, in the controller according to the embodiment of the disclosure, the first channel information is acquired based on a first preset rule, wireless access points of the first channel is scanned to determine the first target wireless access point, and the electronic device is controlled to connect to the first target wireless access point. The first preset rule in the embodiment may be: firstly scanning a wireless access point of a channel to which the electronic device always connects or ever connected. In this way, a speed of scanning wireless access points is increased and a connection speed is increased, a better user experience in wireless network access is obtained.

Figure 17:
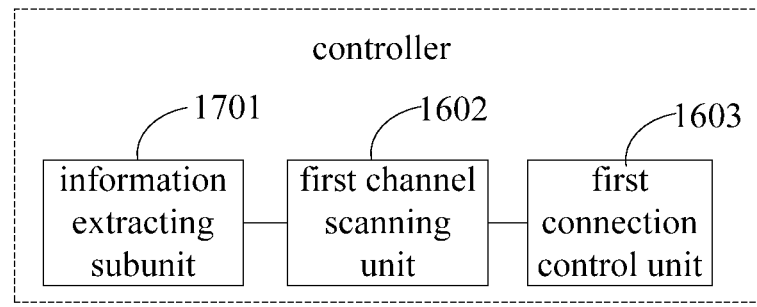
FIG. 17 is a schematic structural diagram of a controller according to an embodiment of the disclosure.

It should be noted that historical connection information about the wireless access point to which the electronic device ever connected may be stored in the electronic device. The historical connection information includes the channel information about the channel the wireless access point of which is connected to the electronic device, connection time, a login user name and a login password or the like. In this case, the first preset rule may include: acquiring the first channel information based on the historical connection information. Reference is made to FIG. 17, which is a schematic structural diagram of a controller according to a seventh embodiment of the disclosure. The first channel acquiring unit 1601 may include an information extracting subunit 1701.

The information extracting subunit 1701 is configured to extract target channel information from the historical connection information about the wireless access point to which the electronic device ever connected as the first channel information.

In the controller according to the embodiment, the wireless access point of the channel to which the electronic device ever connected is firstly scanned, and then the wireless access point to which the electronic device ever connected is found. In this way, the electronic device may quickly connect to the wireless network in the case that the wireless access point of the channel is available. A connection speed is increased significantly, thus a better user experience in wireless network access is obtained.

Figure 18:
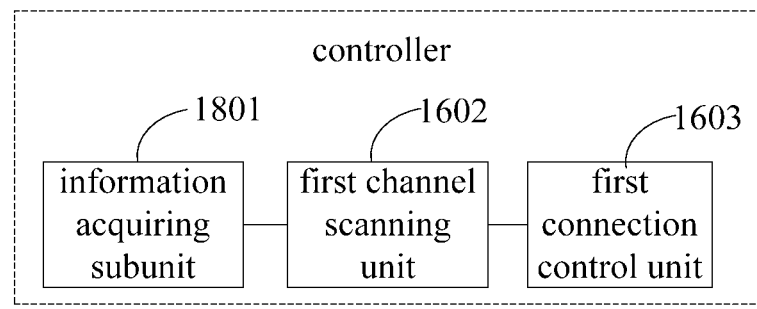
FIG. 18 is a schematic structural diagram of a controller according to an embodiment of the disclosure.

In addition, the first preset rule may also include: acquiring channel information about a channel with a channel frequency lower than a preset first threshold. Reference is made to FIG. 18, which is a schematic structural diagram of a controller according to an embodiment of the disclosure. The first channel acquiring unit 1601 may include an information acquiring subunit 1801.

The information acquiring subunit 1801 is configured to acquire the channel information about the channel with the channel frequency lower than the preset first threshold as the first channel information.

For example, the first threshold may be set to be 3 GHz. In this case, in the existing communication network, the channel information of the channel with the frequency of 2.4 GHz is acquired as the first channel information in the embodiment. In the controller according to the embodiment, the wireless access points of the channel with the frequency of 2.4 GHz is firstly scanned, and then the wireless access point of the channel with the frequency of 2.4 GHz is found. In this way, the electronic device may quickly connect to the wireless network in the case that the wireless access point of the channel is available. A connection speed is increased significantly, and a better user experience in wireless network access is obtained.

As another example, the first threshold may be set to be 6 GHz. In this case, in the existing communication network, the channel information of the channel with the frequency of 2.4 GHz and a channel with the frequency of 5 GHz is acquired as the first channel information in the embodiment. In the controller according to the embodiment, the wireless access points of the channel with the frequency of 2.4 GHz and the channel with the frequency of 5 GHz are firstly scanned, and then the wireless access points of the channel with the frequency of 2.4 GHz and the channel with the frequency of 5 GHz are found. In this way, the electronic device may quickly connect to the wireless network in the case that the found wireless access points are available. The connection speed is increased significantly, and a better user experience in wireless network access is obtained.

Figure 19:
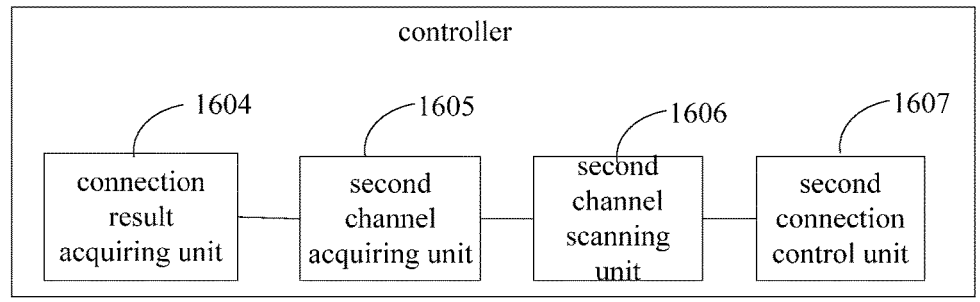
FIG. 19 is a partial schematic structural diagram of a controller according to an embodiment of the disclosure.

Reference is made to FIG. 19, which is a partial schematic structural diagram of a controller according to an embodiment of the disclosure. The controller may further include a connection result acquiring unit 1604, a second channel acquiring unit 1605, a second channel scanning unit 1606 and a second connection control unit 1607.

The connection result acquiring unit 1604 is configured to acquire a first connection result about the electronic device connecting to the first target wireless access point after the first connection control unit 1603 controls the electronic device to connect to the first target wireless access point, and to trigger a second channel acquiring unit 1605 in the case that the first connection result indicates that the electronic device fails to connect to the first target wireless access point.

The second channel acquiring unit 1605 is configured to acquire second channel information based on a second preset rule, wherein the second preset rule is different from the first preset rule.

The second preset rule is different from the first preset rule. And the second preset rule is relative to the first preset rule. For example, in the case that the first preset rule is: acquiring the first channel information based on the historical connection information, the second preset rule is: acquiring the channel information other than the channel information about the channel corresponding to the historical connection information. In the case that the first preset rule is: acquiring the channel information about the channel with the channel frequency lower than the preset first threshold, the second preset rule is: acquiring channel information other than the channel information about the channel with the channel frequency lower than the preset first threshold. The second channel information acquired by the second channel acquiring unit 1605 is the channel information other than the first channel information acquired based on the first preset rule.

The second channel scanning unit 1606 is configured to scan the wireless access point in the network environment in which the electronic device is located with the second channel information to determine a second target wireless access point.

In the controller according to the embodiment, the wireless access points other than the wireless access point found with the first channel information may be scanned with the second channel information in the case that the electronic device fails to connect to the first target wireless access point found with the first channel information, and the second target wireless access point is found.

The second connection control unit 1607 is configured to control the electronic device to connect to the second target wireless access point.

In the controller according to the embodiment, the electronic device firstly scans and connects to the wireless access point of the channel determined based on the first preset rule. The electronic device then scans and connects to the wireless access point of the channel determined based on the second preset rule, in the case that the electronic device fails to connect to the wireless access point of the channel determined based on the first preset rule. In this way, the effectiveness of the electronic device connecting to the network is ensured, and the speed of the electronic device connecting to the network is increased. For example, in the controller according to the embodiment, the electronic device firstly scans and connects to the wireless access point of the channel to which the electronic device ever connected. The electronic device then scans the wireless access point of the channel, such as the domestic commonly used 2.4 G channel and the channel with the frequency of 5 GHz, other than the channel to which the electronic device ever connected in the case that the electronic device fails to connect to the wireless access point of the channel to which the electronic device ever connected. In this case, the electronic device may firstly scan the wireless access point of the channel with the frequency of 2.4 GHz, and then scan the wireless access point of the channel with the frequency of 5 GHz. Alternatively, the electronic device may simultaneously scan the wireless access points of the 2.4 G and the 5 G. In this way, the speed of the electronic device of the user scanning and connecting the WiFi is increased and a better user experience in wireless network access is obtained.

Figure 20:
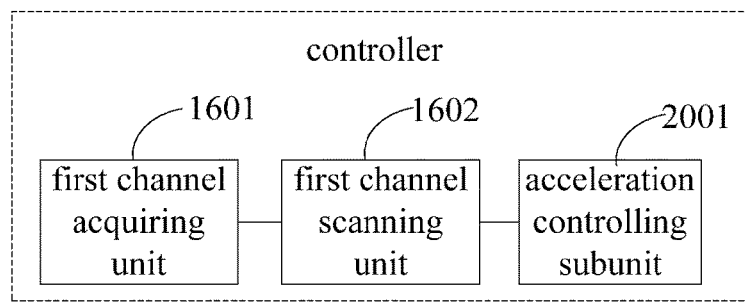
FIG. 20 is a schematic structural diagram of a controller according to an embodiment of the disclosure.

Reference is made to FIG. 20, which is a schematic structural diagram of a controller according to an embodiment of the disclosure. The first connection control unit 1603 may include an acceleration controlling subunit 2001.

The acceleration controlling subunit 2001 is configured to control the electronic device to connect to the first target wireless access point with a preset acceleration connection parameter.

The acceleration connection parameter may be a number of times that the connection is requested per second, for example, 10 times per second, or the acceleration connection parameter may also be an interval for requesting the connection, for example, one connection is requested every 100 ms.

The acceleration controlling subunit 2001 may be implemented as follows.

Once the first target wireless access point is found, a connection request is sent to the first target wireless access point at a frequency of 10 times per second in order to accelerate the connection between the electronic device and the first target wireless access point. Alternatively, a connection request is sent to the first target wireless access point every other 100 ms, to accelerate the connection between the electronic device and the first target wireless access point. Compared with the interval for requesting the connection of 512 ms in the conventional technical solution, the speed at which the electronic device is connected to the scanned wireless access point in the embodiment is significantly improved.

The second connection control unit 1607 may also control the electronic device to connect to the second target wireless access point with the acceleration connection parameter in the above embodiment.

It is also provided according to an embodiment of the disclosure an electronic device provided with any one of the above controllers.

The controller is configured to: acquire first channel information based on a first preset rule; scan wireless access points in a network environment in which the electronic device is located with the first channel information to determine a first target wireless access point; and control the electronic device to connect to the first target wireless access point.

Historical connection information about the wireless access point to which the electronic device ever connected may be stored in the electronic device. In this case, the controller may: extract target channel information from the historical connection information about the wireless access point to which the electronic device ever connected as the first channel information; scan wireless access points in the network environment in which the electronic device is located with the first channel information to determine the first target wireless access point; and control the electronic device to connect to the first target wireless access point. Alternatively, the controller may also: acquire the channel information about the channel with the channel frequency lower than a preset first threshold as the first channel information; scan wireless access points in the network environment in which the electronic device is located with the first channel information to determine the first target wireless access point; and control the electronic device to connect to the first target wireless access point.

It should be noted that, in the case that a first connection result about the electronic device connecting to the first target wireless access point indicates that the electronic device fails to connect to the first target wireless access point, the controller: acquires second channel information based on a second preset rule; scans wireless access points in the network environment in which the electronic device is located with the second channel information to determine a second target wireless access point; and controls the electronic device to connect to the second target wireless access point, where the second preset rule is different from the first preset rule.

The controller may control the electronic device to connect to the first target wireless access point with an acceleration connection parameter. And the controller may also control the electronic device to connect to the second target wireless access point with the acceleration connection parameter.

Figure 21:
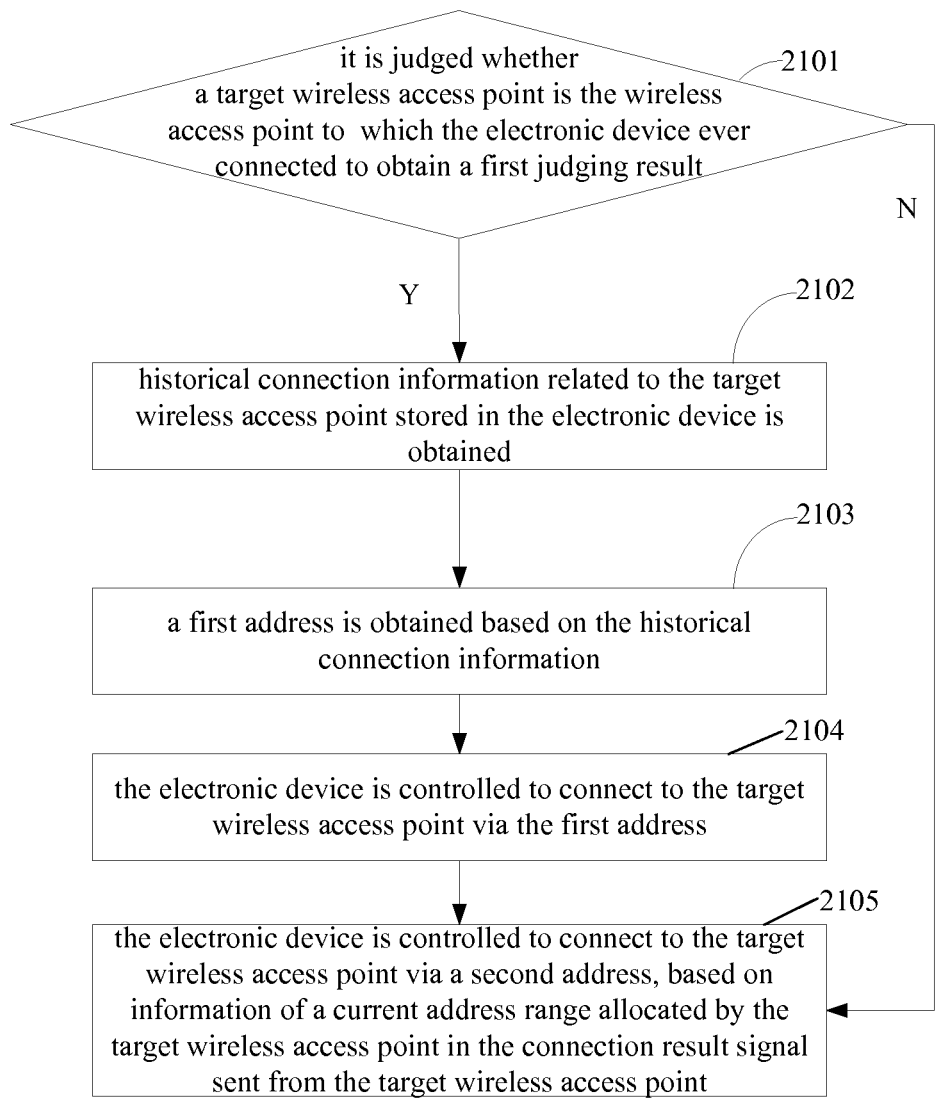
FIG. 21 is a flowchart of a control method according to an embodiment of the disclosure.

Reference is made to FIG. 21 which is a flowchart of a control method according to an embodiment of the disclosure. The method is applied to an electronic device which may be a mobile phone or a pad tablet computer or the like. Historical connection information related to a wireless access point to which the electronic device ever connected is stored in the electronic device. The method includes step 2101 to step 2105.

In step 2101, it is judged whether a target wireless access point is the wireless access point to which the electronic device ever connected to obtain a first judging result, in the case that the target wireless access point is found and a connection result signal sent from the target wireless access point indicates that the number of current connections to the target wireless access point reaches a preset connection limit. Step 2102 is performed in the case that the first judging result indicates that the target wireless access point is the wireless access point to which the electronic device ever connected. Step 2105 is performed in the case that the first judging result indicates that the target wireless access pint is not the wireless access point to which the electronic device ever connected.

In the case that the wireless network function of the electronic device is started, the electronic device begins to search for a WIFI network in an environment where the electronic device is located. In the case that a target wireless access point AP is found by the electronic device, the electronic device attempts to connect to the target wireless access point, i.e., the electronic device sends a connection request to the target wireless access point using a valid login user name and a password; the target wireless access point checks whether the connection request meets a login requirement and whether the number of current connections to the target wireless access point reaches a preset connection limit, and the target wireless access point sends a connection result signal to the electronic device. It is judged whether the target wireless access point is the wireless access point to which the electronic device ever connected to obtain a first judging result in the case that the connection result signal indicates that the number of current connections to the target wireless access point reaches the preset connection limit.

In the case that it is judged in step 2101 whether the target wireless access point is the wireless access point to which the electronic device ever connected, whether the historical connection information stored in the electronic device includes information related to the target wireless access point is checked, and the first judging result indicating whether the electronic device ever connected to the target wireless access point is obtained.

In step 2102, historical connection information related to the target wireless access point stored in the electronic device is obtained, and step 2103 is performed.

In the case that the first judging result indicates that the electronic device ever connected to the target wireless access point, in step 2102, the historical connection information related to the target wireless access point is extracted from the historical connection information related to the wireless access point to which the electronic device ever connected in the electronic device.

It should be noted that, the historical connection information includes connection time when the electronic device ever connected to the target wireless access point, a connection address which is allocated to the electronic device by the target wireless access point and a MAC address of the target wireless access point.

In step 2103, a first address is obtained based on the historical connection information, and step 2104 is performed.

In step 2103, the first address is obtained by analyzing the historical connection information.

In step 2104, the electronic device is controlled to connect to the target wireless access point via the first address.

Step 2104 may include that: the electronic device is controlled to start a static IP address setting to connect to the target wireless access point via the first address, thereby establishing a network connection between the electronic device and the target wireless access point.

In step 2105, the electronic device is controlled to connect to the target wireless access point via a second address, based on information of a current address range allocated by the target wireless access point in the connection result signal sent from the target wireless access point.

Step 2105 may include that: in the case that the target wireless access point is not the wireless access point to which the electronic device ever connected, the second address is obtained based on information of a current address range allocated to a connected terminal by the target wireless access point. Thus, the electronic device is controlled to connect to the target wireless access point via the second address, thus a network connection between the electronic device and the target wireless access point is established in the case that the number of connections to the target wireless access point reaches the preset connection limit.

According to the above solution, in the control method provided by the embodiment of the disclosure, in the case that a target wireless access point is found by the electronic device and the number of connections to the target wireless access point reaches the limit, it is judged whether the target wireless access point is the wireless access point to which the electronic device ever connected, and the electronic device connects to the target wireless access point by applying different ways accordingly. That is to say, in the case that the electronic device ever connected to the target wireless access point, the first address is obtained from the historical connection information of the target wireless access point stored in the electronic device, thus the electronic device is controlled to connect to the target wireless access point via the first address; in the case that the electronic device did not ever connect to the target wireless access point, the electronic device is controlled to connect to the target wireless access point via the second address, based on the current address range allocated to the terminal by the target wireless access point, thus the electronic device may also connect to the target wireless access point in the case that the network is congested since the number of connections to the target wireless access point reaches the preset connection limit, thus the electronic device connects to the network smoothly and a user experience is improved significantly.

Figure 22:
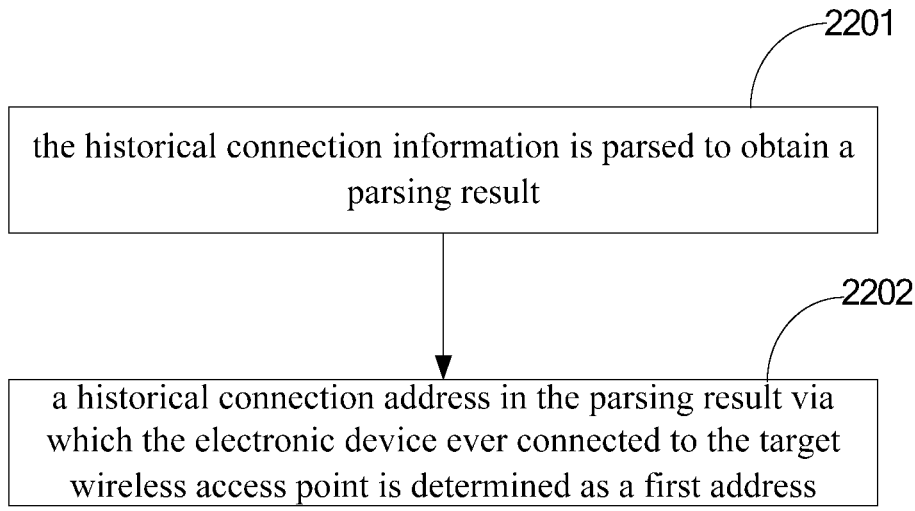
FIG. 22 is a flowchart of a part of the control method according to an embodiment of the disclosure.

Reference is made to FIG. 22 which is a flowchart for performing step 2103 of the control method according to an embodiment of the disclosure. Step 2103 may include step 2201 to step 2202.

In step 2201, the historical connection information is parsed to obtain a parsing result.

Step 2201 may include that: MAC address information of the target wireless access point in the historical connection information, information of the address ever allocated to the electronic device by the target wireless access point and time when the electronic device connected to the target wireless access point are parsed and extracted to obtain the parsing result.

In step 2202, a historical connection address in the parsing result via which the electronic device ever connected to the target wireless access point is determined as a first address.

That is to say, in the embodiment, the first address is an address via which the electronic device ever connected to the target wireless access point. It should be noted that, an address allocating rule to allocate an address to a terminal that requests to connect to the target wireless access point changes based on certain rules. Hence, in the case that the electronic device connects to the target wireless access point again, the target wireless access point alis located an address to the terminal based on an address allocating rule different from the prior one, and the first address may be not included in a current address range allocated to the terminal by the target wireless access point. In this case, the electronic device may directly connect to the target wireless access point via an address by which the electronic device ever connected to the target wireless access point, thus the electronic device connects to the target wireless access point quickly and efficiently, and the user may also surf the network via the electronic device even in a congested WIFI network environment.

Figure 23:
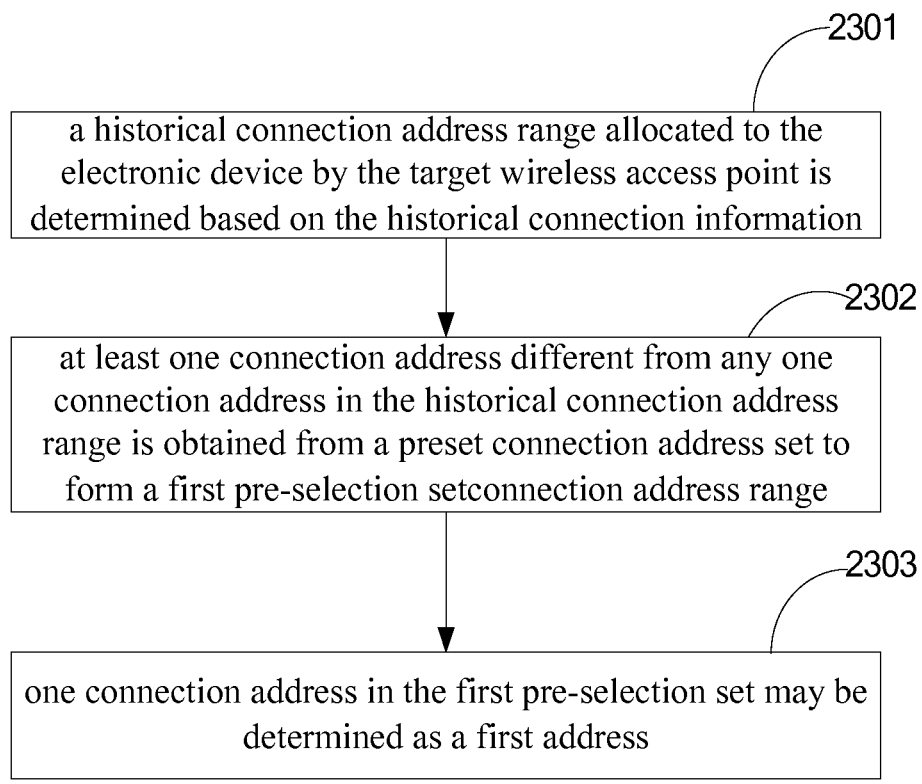
FIG. 23 is a flowchart of a part of the control method according to an embodiment of the disclosure.

Reference is made to FIG. 23 which is a flowchart for performing step 2103 of the control method according to an embodiment of the disclosure. Step 2103 may also include step 2301 to step 2303.

In step 2301, a historical connection address range allocated to the electronic device by the target wireless access point is determined based on the historical connection information. The historical connection address range includes at least one connection address.

For example, during a historical connection between the electronic device and the target wireless access point, the target wireless access point alis located an address range of 192.168.0.31~192.168.0.90 to the electronic device based on a preset address allocating rule. There are 60 connection addresses in the address range.

In step 2302, at least one connection address different from any one connection address in the historical connection address range is obtained from a preset connection address set to form a first pre-selection set, and the preset connection address set includes multiple connection addresses including all the connection addresses in the historical connection address range.

The preset connection address set may be an address range of 192.168.0.1~192.168.0.255. There are 255 connection addresses in the address range and apparently the address range of 192.168.0.31~192.168.0.90 in the historical connection address range is included in the preset connection address set.

The first pre-selection set may be an address set formed by multiple connection addresses other than connection addresses in the historical connection address range in the preset connection address set. An address in the first pre-selection set may be any connection address among 192.168.0.1~192.168.0.30 and 192.168.0.91~192.168.0.255.

In step 2303, one connection address in the first pre-selection set may be determined as a first address.

It should be noted that, the address allocating rule of the target wireless access point to allocate an address to a terminal that requests to connect to the target wireless access point may not change. Therefore, in the case that the electronic device connects to the target wireless access point again, the target wireless access point alis located an address for the terminal based on the same address allocating rule, and no address in the first pre-selection set is in the current address range allocated to the terminal by the target wireless access point. Hence, the electronic device may directly connect to the target wireless access point via the first address randomly selected from the first pre-selection set, thus the electronic device connects to the target wireless access point quickly and efficiently, and the user may also surf the network via the electronic device even in a congested WIFI network environment.

Step 2303 may be performed by multiple ways or based on different address selecting rules. For example, step 2303 may be performed by a first way.

In the first way, one connection address is randomly selected from the first pre-selection set as the first address.

In the first way, the address selecting rule is a random selecting rule.

Alternatively, step 2303 may be also performed by a second way.

In the second way, one connection address with an address rank value meeting a preset address selecting rule is selected from the first pre-selection set as the first address.

The second way may include that: firstly connection addresses in the first pre-selection set are ranked, and then one connection address with an address rank value meeting the address selecting rule is selected as the first address. For example, one connection address with the maximum address rank value 255 or the minimum address rank value 1 is selected as the first address.

Figure 24:
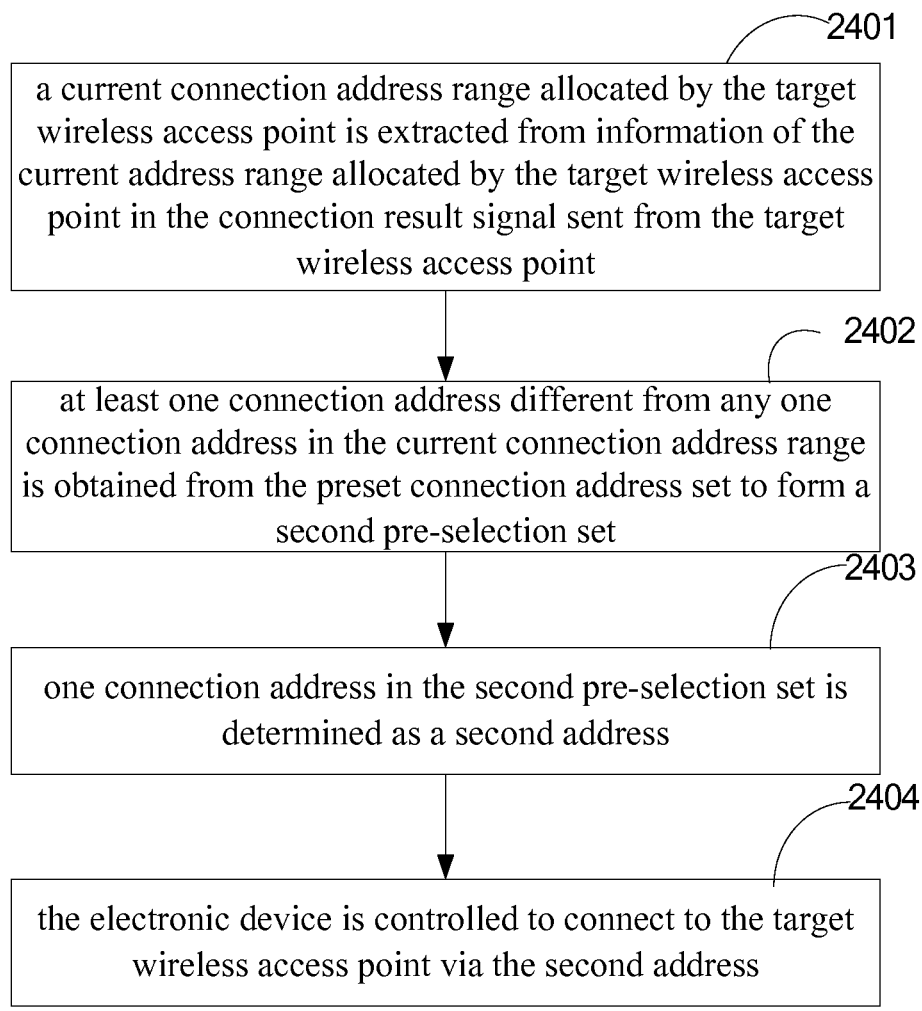
FIG. 24 is a flowchart of a part of the control method according to an embodiment of the disclosure.

Reference is made to FIG. 24 which is a flowchart for performing step 2105 of the control method according to an embodiment of the disclosure. Step 2105 may include step 2401 to step 2404.

In step 2401, a current connection address range allocated by the target wireless access point is extracted from information of the current address range allocated by the target wireless access point in the connection result signal sent from the target wireless access point. The current connection address range includes at least one connection address.

The connection result signal includes information of the current address range allocated to terminals connected to the target wireless access point by the target wireless access point, hence in step 2401 the current connection address range allocated by the target wireless access point may be extracted from the information. For example, the address range of 192.168.0.31~192.168.0.90 is extracted, which includes 60 connection addresses.

In step 2402, at least one connection address different from any one connection address in the current connection address range is obtained from the preset connection address set to form a second pre-selection set. The preset connection address set includes multiple connection addresses including all the connection addresses in the current connection address range.

The preset connection address set may be an address range 192.168.0.1~192.168.0.255, which includes 255 connection addresses and apparently includes the address range of 192.168.0.31~192.168.0.90 in the current connection address range.

The second pre-selection set may be an address set formed by multiple connection addresses other than connection addresses in the current connection address range in the preset connection address set. For example, an address in the second pre-selection set may be any connection address among 192.168.0.1~192.168.0.30 and 192.168.0.91~192.168.0.255.

In step 2403, one connection address in the second pre-selection set is determined as a second address.

In step 2403, one connection address randomly selected from the second pre-selection set may be determined as the second address, or one connection address with the maximum or minimum address rank value selected from the second pre-selection set may be determined as the second address.

It should be noted that, the address allocating rule of the target wireless access point to allocate an address for the terminal that requests to connect to the target wireless access point may not change or change at any time, hence in the case that the electronic device connects to the target wireless access point again, the target wireless access point may allocate an address for the terminal based on the same or different address allocating rule. In the case that the target wireless access point alis located the same address range for the connected terminal, the second address is different from the first address. In the case that the target wireless access point changes the address allocating rule, the second address is not directly associated with the first address.

In step 2404, the electronic device is controlled to connect to the target wireless access point via the second address.

Figure 25:
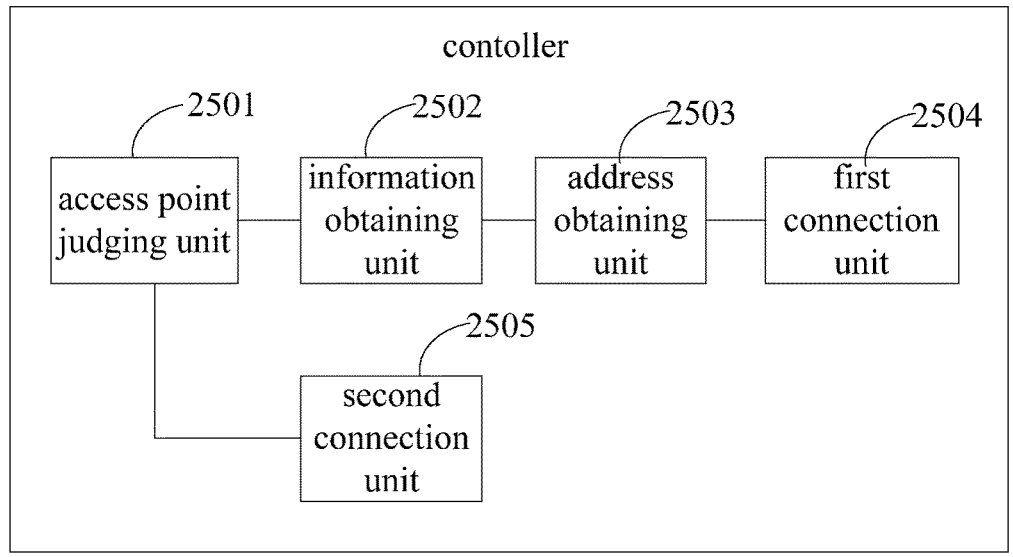
FIG. 25 is a schematic structural diagram of a controller according to an embodiment of the disclosure.

Reference is made to FIG. 25 which is a schematic structural diagram of a controller according to an embodiment of the disclosure. The controller in the embodiment is arranged in an electronic device which may be a mobile phone or a pad tablet computer or the like. Historical connection information related to a wireless access point to which the electronic device ever connected is stored in the electronic device. The controller may include an access point judging unit 2501, an information obtaining unit 2502, an address obtaining unit 2503, a first connection unit 2504 and a second connection unit 2505 hereinafter.

The access point judging unit 2501 is configured to judge whether a target wireless access point is a wireless access point to which the electronic device ever connected to obtain a first judging result in the case that the target wireless access point is found by the electronic device and a connection result signal sent from the target wireless access point indicates that the number of current connections to the target wireless access point reaches a preset connection limit; trigger the information obtaining unit 2502 in the case that the first judging result indicates that the target wireless access point is the wireless access point to which the electronic device ever connected; and trigger the second connection unit 2505 in the case that the first judging result indicates that the target wireless access point is not the wireless access point to which the electronic device ever connected.

In the case that the wireless network function of the electronic device is started, the electronic device begins to search for a WIFI network in an environment where the electronic device is located. In the case that a target wireless access point AP is found by the electronic device, the electronic device attempts to connect to the target wireless access point, i.e., the electronic device sends a connection request to the target wireless access point by using a valid login user name and a password; the target wireless access point checks whether the connection request meets a login requirement and whether the number of current connections to the target wireless access point reaches a preset connection limit, and the target wireless access point sends a connection result signal to the electronic device. It is judged whether the target wireless access point is the wireless access point to which the electronic device ever connected to obtain a first judging result in the case that the connection result signal indicates that the number of current connections to the target wireless access point reaches the preset connection limit.

In the case that the access point judging unit 2501 judges whether the target wireless access point is the wireless access point to which the electronic device ever connected, the access point judging unit 2501 may check whether the historical connection information stored in the electronic device includes information related to the target wireless access point, and obtain the first judging result indicating whether the electronic device ever connected to the target wireless access point.

The information obtaining unit 2502 is configured to obtain historical connection information related to the target wireless access point stored in the electronic device to trigger the address obtaining unit 2503.

In the case that the first judging result indicates that the electronic device ever connected to the target wireless access point, the information obtaining unit 2502 may extract historical connection information related to the target wireless access point from the historical connection information related to the wireless access point to which the electronic device ever connected in the electronic device.

It should be noted that, the historical connection information includes connection time when the electronic device ever connected to the target wireless access point, a connection address which is allocated to the electronic device by the target wireless access point and a MAC address of the target wireless access point.

The address obtaining unit 2503 is configured to obtain a first address based on the historical connection information to trigger the first connection unit 2504.

The address obtaining unit 2503 may obtain the first address by analyzing the historical connection information.

The first connection unit 2504 is configured to control the electronic device to connect to the target wireless access point via the first address.

The first connection unit 2504 may be configured to control the electronic device to start a static IP address setting to connect to the target wireless access point via the first address, thereby establishing a network connection between the electronic device and the target wireless access point.

The second connection unit 2505 is configured to control the electronic device to connect to the target wireless access point via a second address, based on information of a current address range allocated by the target wireless access point in a connection result signal sent from the target wireless access point.

The second connection unit 2505 may be configured to obtain the second address based on information of a current address range allocated to a connected terminal by the target wireless access point in the case that the target wireless access point is not the wireless access point to which the electronic device ever connected. Thus, the electronic device is controlled to connect to the target wireless access point via the second address, and a network connection between the electronic device and the target wireless access point is established in the case that the number of connections to the target wireless access point reaches the preset connection limit.

According to the above solutions, in the controller according to the embodiment of the disclosure, in the case that a target wireless access point is found by the electronic device and the number of connections to the target wireless access point reaches the limit, it is judged whether the target wireless access point is the wireless access point to which the electronic device ever connected, and the electronic device connects to the target wireless access point by applying different ways accordingly. That is to say, in the case that the electronic device ever connected to the target wireless access point, the first address is obtained from the historical connection information of the target wireless access point stored in the electronic device, thus the electronic device is controlled to connect to the target wireless access point via the first address; in the case that the electronic device did not ever connect to the target wireless access point, the electronic device is controlled to connect to the target wireless access point via the second address based on the current address range allocated to the terminal by the target wireless access point, thus the electronic device may also connect to the target wireless access point in the case that the network is congested since the number of connections to the target wireless access point reaches the preset connection limit, thus the electronic device connects to the network smoothly and a user experience is improved significantly.

Figure 26:
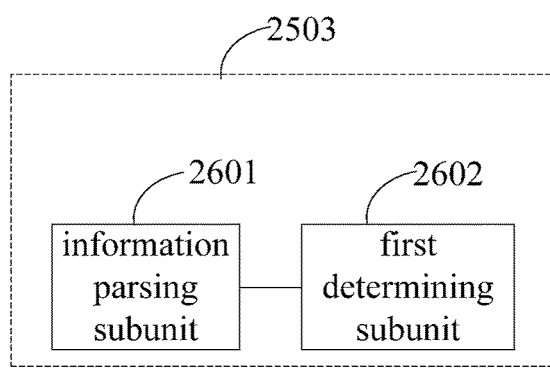
FIG. 26 is a schematic structural diagram of a part of the controller according to an embodiment of the disclosure.

Reference is made to FIG. 26 which is schematic structural diagram of the address obtaining unit 2503 of the controller according to an embodiment of the disclosure. The address obtaining unit 2503 may include an information parsing subunit 2601 and a first determining subunit 2602.

The information parsing subunit 2601 is configured to parse the historical connection information to obtain a parsing result.

The information parsing subunit 2601 may be configured to parse and extract MAC address information of the target wireless access point in the historical connection information, information of an address ever allocated to the electronic device by the target wireless access point and time when the electronic device connected to the target wireless access point, to obtain the parsing result.

The first determining subunit 2602 is configured to determine a historical connection address in the parsing result using which the electronic device ever connected to the target wireless access point as a first address.

That is to way, in the embodiment, the first address is an address via which the electronic device ever connected to the target wireless access point. It should be noted that, an address allocating rule to allocate an address to a terminal that requests to connect to the target wireless access point changes based on certain rules. Hence, in the case that the electronic device connects to the target wireless access point again, the target wireless access point alis located an address to the terminal based on an address allocating rule different from the prior one, and the first address may be not included in a current address range allocated to the terminal by the target wireless access point. In this case, the electronic device may directly connect to the target wireless access point via an address by which the electronic device ever connected to the target wireless access point, thus the electronic device connects to the target wireless access point quickly and efficiently, and the user may surf the network via the electronic device even in a congested WIFI network environment.

Figure 27:
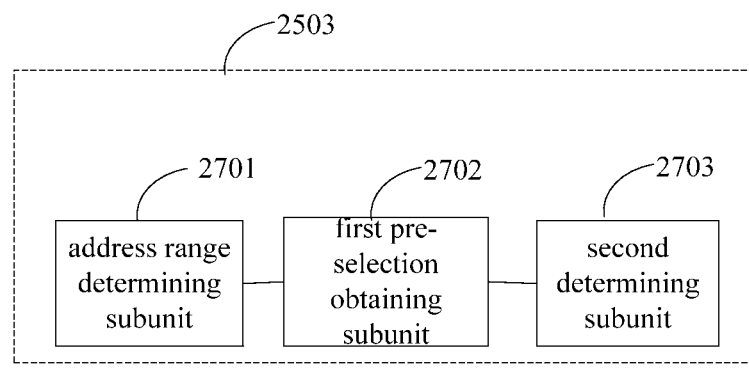
FIG. 27 is a schematic structural diagram of a part of the controller according to an embodiment of the disclosure.

Reference is made to FIG. 27 which is a schematic structural diagram of the address obtaining unit 2503 of the controller according to an embodiment of the disclosure. A function of the address obtaining unit 2503 may be also implemented via an address range determining subunit 2701, a first pre-selection obtaining subunit 2702 and a second determining subunit 2703 hereinafter.

The address range determining subunit 2701 is configured to determine, based on the historical connection information, a historical connection address range allocated to the electronic device by the target wireless access point. The historical connection address range includes at least one connection address.

For example, in a historical connection between the electronic device and the target wireless access point, the target wireless access point located an address range of 192.168.0.31~192.168.0.90 to the electronic device based on a preset address allocating rule. 60 connection addresses are included in the address range.

The first pre-selection obtaining subunit 2702 is configured to obtain, from a preset connection address set, at least one connection address different from any one connection address in the historical connection address range to form a first pre-selection set. The preset connection address set includes multiple connection addresses including all the connection addresses in the historical connection address range.

The preset connection address set may be an address range of 192.168.0.1~192.168.0.255. There are 255 connection addresses in the address range and apparently includes the address range of 192.168.0.31~192.168.0.90 in the historical connection address range is included in the preset connection address set.

The first pre-selection set may be an address set formed by multiple connection addresses other than connection addresses in the historical connection address range in the preset connection address set. For example, an address in the first pre-selection set may be any connection address among 192.168.0.1~192.168.0.30 and 192.168.0.91~192.168.0.255.

The second determining subunit 2703 is configured to determine one connection address in the first pre-selection set as the first address.

It should be noted that, the address allocating rule of the target wireless access point to allocate an address to a terminal that requests to connect to the target wireless access point may not change. Hence, in the case that the electronic device connects to the target wireless access point again, the target wireless access point locates an address for the terminal based on the same address allocating rule, and no address in the first pre-selection set is in the current address range allocated to the terminal by the target wireless access point. Therefore, the electronic device may directly connect to the target wireless access point via the first address randomly selected from the first pre-selection set, thus the electronic device connects to the target wireless access point quickly and efficiently, and the user may also surf the network via the electronic device even in a congested WIFI network environment.

Figure 28:
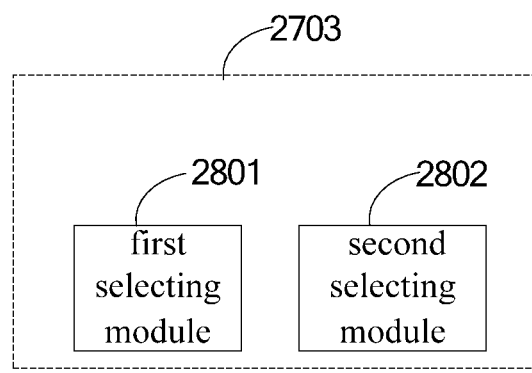
FIG. 28 is schematic structural diagram of another part of the controller according to an embodiment of the disclosure.

A function of the second determining subunit 2703 may be implemented by any module shown in FIG. 28. Reference is made to FIG. 28 which is a schematic structural diagram of the second determining subunit 2703 according to an embodiment of the disclosure. The second determining subunit 2703 may include a first selecting module 2801 and a second selecting module 2802.

The first selecting module 2801 is configured to randomly select one connection address from the first pre-selection set as the first address.

In the first way, the address selecting rule is a random selecting rule.

The second selecting module 2802 is configured to select, from the first pre-selection set, one connection address with an address rank value meeting a preset address rule as the first address.

The second way may include that: firstly connection addresses in the first pre-selection set are ranked, and then one connection address with an address rank value meeting the address selecting rule is selected as the first address. For example, a connection address with the maxim address rank value 255 or the minimum address rank value 1 is selected as the first address.

Figure 29:
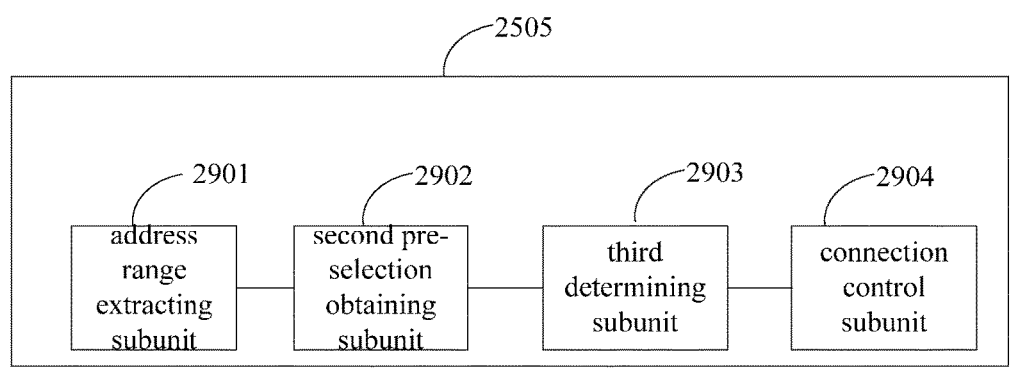
FIG. 29 is a schematic structural diagram of a part of the controller according to an embodiment of the disclosure.

Reference is made to FIG. 29 which is schematic structural diagram of the second connection unit 2505 of the controller according to an embodiment of the disclosure. A function of the second connection unit 2505 may be implemented by an address range extracting subunit 2901, a second pre-selection obtaining subunit 2902, a third determining subunit 2903 and a connection control subunit 2904 hereinafter.

The address range extracting subunit 2901 is configured to extract a current connection address range allocated to the target wireless access point from information of the current address range allocated by the target wireless access point in a connection result signal sent from the target wireless access point. The current connection address range includes at least one connection address.

The connection result signal includes the information of the current address range allocated to terminals connected to the target wireless access point by the target wireless access point, hence the address range extracting subunit 2901 may extract the current connection address range allocated by the target wireless access point from the information. For example, the current connection address range may be an address range of 192.168.0.31~192.168.0.90, which includes 60 connection addresses.

The second pre-selection obtaining subunit 2902 is configured to obtain, from the preset connection address set, at least one connection address different from any one connection address in the current connection address range to form a second pre-selection set. The preset connection address set includes multiple connection addresses including all the connection addresses in the current connection address range.

The preset connection address set may be an address range of 192.168.0.1~192.168.0.255. The address range includes 255 connection addresses and apparently includes the address range of 192.168.0.31~192.168.0.90 in the current connection address range.

The second pre-selection set may be an address set formed by multiple connection addresses other than connection addresses in the current connection address range in the preset connection address set. For example, an address in the second pre-selection set may be any connection address among 192.168.0.1~192.168.0.30 and 192.168.0.91~192.168.0.255.

The third determining subunit 2903 is configured to determine one connection address in the second pre-selection set as a second address.

The third determining subunit 2903 may determine one connection address randomly selected from the second pre-selection set as the second address, or may also determine one connection address with the maximum or minimum address rank value selected from the second pre-selection set as the second address.

It should be noted that, the address allocating rule of the target wireless access point to allocate an address to the terminal that requests to connect to the target wireless access point may not change or change at any time. Hence, in the case that the electronic device connects to the target wireless access point again, the target wireless access point may allocate an address for the terminal based on the same or different address allocating rule. In the case that the target wireless access point alis located the same address range to the connected terminal, the second address is different from the first address. In the case that the target wireless access point changes the address allocating rule, the second address is not directly associated with the first address.

The connection control subunit 2904 is configured to control the electronic device to connect to the target wireless access point via the second address.

An electronic device is further provided according to an embodiment of the disclosure. The electronic device may be a mobile phone or a pad tablet computer or the like. Historical connection information related to a wireless access point to which the electronic device ever connected is stored in the electronic device. The electronic device further includes the controller described according to any of the above apparatus embodiment.

The controller is configured to judge whether a target wireless access point is a wireless access point to which the electronic device ever connected to obtain a first judging result in the case that the target wireless access point is found by the electronic device and a connection result signal sent from the target wireless access point indicates that the number of current connections to the target wireless access point reaches a preset connection limit. Historical connection information related to the target wireless access point in the electronic device is obtained, a first address is obtained based on the historical connection information, and the electronic device is controlled to connect to the target wireless access point using the first address in the case that the first judging result indicates that the target wireless access point is the wireless access point to which the electronic device ever connected. The electronic device is controlled to connect to the target wireless access point via a second address based on information of the current address range allocated by the target wireless access point in the connection result signal sent from the target wireless access point in the case that the first judging result indicates that the target wireless access point is not the wireless access point to which the electronic device ever connected.

Thus, in the case that a target wireless access point is found by the electronic device in the embodiment and the number of connections to the target wireless access point reaches the limit, it is judged whether the target wireless access point is the wireless access point to which the electronic device ever connected, and the electronic device connects to the target wireless access point by different ways accordingly. That is to say, in the case that the electronic device ever connected to the target wireless access point, the first address is obtained from the historical connection information of the target wireless access point stored in the electronic device, so the electronic device is controlled to connect to the target wireless access point via the first address; in the case that the electronic device did not ever connect to the target wireless access point, the electronic device is controlled to connect to the target wireless access point via the second address based on the current address range allocated to the terminal by the target wireless access point, thus the electronic device may also connect to the target wireless access point in the case that the network is congested since the number of connections to the target wireless access point reaches the preset connection limit, thus the electronic device connects to the network smoothly and a user experience is improved significantly.

It should be noted that, the embodiments of the description are described herein in a progressive manner, with the emphasis of each of the embodiments on the difference between it and the other embodiments; hence, for the same or similar parts between the embodiments, one can refer to the other embodiments.

At last, it should be noted that, relational terms, such as first and second, herein are just used to distinguish one entity or operation from another entity or operation, and they do not necessarily require or indicate that any of such actual relationships or sequences exists between these entities or operations. In addition, terms "comprise", "include" or any other variation thereof intends to be understood in a non-exclusive sense, so that a process, a method, an object or a device including a series of elements not only includes these elements, but also includes other elements not explicitly listed, or further includes elements inherent in the process, the method, the object or the device. In the absence of more restrictions, an element defined by a sentence "includes a . . . " does not exclude other same elements which may also exist in the process, the method, the object or the device including said element.

The control method, the controller and the electronic device according to the disclosure have been introduced in detail in the above. Specific examples are utilized herein to illustrate the principle and embodiments of the disclosure, and the above description of the embodiments are only used to help the reader understand the method of the disclosure and the core ideas thereof. Meanwhile, for those skilled in the art, variations may be made to the specific embodiments and applications based on the ideas of the disclosure. In summary, the content of the description should not be interpreted as limiting the disclosure.

The invention claimed is:

1. A control method, comprising:
controlling an electronic device to connect to a wireless access point corresponding to a first channel based on a first preset rule;
controlling the electronic device to connect to the wireless access point corresponding to the first channel or a wireless access point corresponding to a second channel based on a second preset rule;
wherein the first preset rule is different from the second preset rule, and a frequency of the first channel is higher than the frequency of the second channel; and
wherein to control the electronic device to connect to the wireless access point corresponding to the first channel, the method further comprises:
controlling the electronic device to connect to the wireless access point corresponding to the first channel with a preset acceleration connection parameter;
wherein controlling the electronic device to connect to a wireless access point corresponding to the first channel or a wireless access point corresponding to a second channel comprises:
acquiring a difference between a received signal strength of a second channel and a received signal strength of the first channel; and
controlling the electronic device to connect to a wireless access point corresponding to the second channel if the difference is greater than a second preset threshold, or controlling the electronic device to connect to a wireless access point corresponding to the first channel if the difference is smaller than or equal to the second preset threshold.

2. The method according to claim 1, wherein before the electronic device is controlled to connect to a wireless access point, the method further comprises:
acquiring a network parameter of a network environment where the electronic device is located;
wherein the first preset rule comprises the network parameter is greater than or equal to a first preset threshold, the second preset rule comprises the network parameter is smaller than the first preset threshold.

3. The method according to claim 2, wherein controlling the electronic device to connect to the wireless access point corresponding to the first channel comprises:
determining a first target wireless access point in the network environment where the electronic device is located by scanning the first channel; and
controlling the electronic device to connect to the first target wireless access point.

4. The method according to claim 1, wherein controlling the electronic device to connect to the wireless access point corresponding to the second channel comprises:
determining a second target wireless access point in a network environment where the electronic device is located by scanning the second channel; and
controlling the electronic device to connect to the second target wireless access point.

5. The method according to claim 1, wherein, controlling an electronic device to connect to a wireless access point corresponding to a first channel based on a first preset rule comprises:
acquiring first channel information based on the first preset rule;
scanning wireless access points in a network environment in which the electronic device is located with the first channel information to determine a first target wireless access point; and
controlling the electronic device to connect to the first target wireless access point.

6. The control method according to claim 5, wherein historical connection information about the wireless access point to which the electronic device ever connected is stored in the electronic device;
the first preset rule comprises: acquiring the first channel information based on the historical connection information; and
acquiring first channel information based on a first preset rule comprises:
extracting target channel information from the historical connection information about the wireless access point to which the electronic device ever connected as the first channel information.

7. The control method according to claim 5, wherein the first preset rule comprises: acquiring channel information about a channel with a channel frequency lower than a preset first threshold; and
acquiring first channel information based on a first preset rule comprises:
acquiring channel information about the channel with the channel frequency lower than the preset first threshold as the first channel information.

8. The control method according to claim 5, wherein after controlling the electronic device to connect to the first target wireless access point, the method further comprises:
acquiring a first connection result about the electronic device connecting to the first target wireless access point;
controlling the electronic device to connect to a wireless access point corresponding to the first channel or a wireless access point corresponding to a second channel based on a second preset rule comprises:
acquiring second channel information based on a second preset rule in the case that the first connection result indicates that the electronic device fails to connect to the first target wireless access point;
scanning wireless access points in the network environment in which the electronic device is located with the second channel information to determine a second target wireless access point; and
controlling the electronic device to connect to the second target wireless access point.

9. The control method according to claim 1, wherein historical connection information related to a wireless access point to which the electronic device ever connected is stored in the electronic device, and controlling the electronic device to connect to a wireless access point comprises:
judging whether a target wireless access point is a wireless access point to which the electronic device ever connected to obtain a first judging result in the case that the target wireless access point is found and a connection result signal sent from the target wireless access point indicates that a number of current connections to the target wireless access point reaches a preset connection limit;
obtaining historical connection information related to the target wireless access point in the electronic device, obtaining a first address based on the historical connection information and controlling the electronic device to connect to the target wireless access point via the first address in the case that the first judging result indicates that the target wireless access point is the wireless access point to which the electronic device ever connected; or
controlling the electronic device to connect to the target wireless access point via a second address based on information of a current address range allocated by the target wireless access point comprised in a connection result signal sent from the target wireless access point in the case that the first judging result indicates that the target wireless access point is not the wireless access point to which the electronic device ever connected.

10. The method according to claim 9, wherein obtaining a first address based on the historical connection information comprises:
parsing the historical connection information to obtain a parsing result; and
determining a historical connection address in the parsing result as the first address, wherein the electronic device ever connected to the target wireless access point via the historical connection address.

11. The method according to claim 9, wherein obtaining a first address based on the historical connection information comprises:
determining, based on the historical connection information, a historical connection address range allocated to the electronic device by the target wireless access point, wherein the historical connection address range comprises at least one connection address;
obtaining, from a preset connection address set, at least one connection address different from any one connection address in the historical connection address range to form a first pre-selection set, wherein the preset connection address set comprises a plurality of connection addresses comprising all the connection addresses in the historical connection address range; and
determining one connection address in the first pre-selection set as the first address.

12. The method according to claim 11, wherein determining one connection address in the first pre-selection set as the first address comprises:
randomly selecting one connection address from the first pre-selection set as the first address; or
selecting one connection address with an address rank value meeting a preset address selecting rule from the first pre-selection set as the first address.

13. The method according to claim 9, wherein controlling the electronic device to connect to the target wireless access point via a second address based on information of a current address range allocated by the target wireless access point in the connection result signal sent from the target wireless access point comprises:
extracting a current connection address range allocated by the target wireless access point from the information of the current address range allocated by the target wireless access point in the connection result signal sent from the target wireless access point, wherein the current connection address range comprises at least one connection address;
obtaining, from a preset connection address set, at least one connection address different from any one connection address in the current connection address range to form a second pre-selection set, wherein the preset connection address set comprises a plurality of connection addresses comprising all the connection addresses in the current connection address range;
determining one connection address in the second pre-selection set as a second address; and
controlling the electronic device to connect to the target wireless access point using the second address.

14. An electronic device, comprising a processor and a memory storing computer-readable instructions, wherein the processor is configured to execute the computer-readable instructions to:
control an electronic device to connect to a wireless access point corresponding to a first channel based on a first preset rule; and
control the electronic device to connect to the wireless access point corresponding to the first channel or a wireless access point corresponding to a second channel based on a second preset rule;
wherein the first preset rule is different from the second preset rule, and a frequency of the first channel is higher than the frequency of the second channel; and
wherein to control the electronic device to connect to the wireless access point corresponding to the first channel, the processor executes the computer-readable instructions to control the electronic device to connect to the wireless access point corresponding to the first channel with a preset acceleration connection parameter; and
wherein the processor further executes the computer-readable instructions to:
acquire a difference between a received signal strength of the second channel and a received signal strength of the first channel, and control the electronic device to connect to the wireless access point corresponding to the second channel if the difference is greater than a second preset threshold, or control the electronic device to connect to the wireless access point corresponding to the first channel if the difference is smaller than or equal to the second preset threshold.

15. The electronic device according to claim 14, wherein the processor further executes the computer-readable instructions to:
  acquire a network parameter of a network environment where the electronic device is located, and control the electronic device to connect to the wireless access point corresponding to the first channel based on the first preset rule if the network parameter is greater than or equal to a first preset threshold, or control the electronic device to connect to the wireless access point corresponding to the first channel or the wireless access point corresponding to the second channel based on the second preset rule if the network parameter is smaller than the first threshold;
  wherein the first preset rule comprises the network parameter is greater than or equal to a first preset threshold, the second preset rule comprises the network parameter is smaller than the first preset threshold.

16. The electronic device according to claim 15, wherein the processor further executes the computer-readable instructions to:
  determine a first target wireless access point in the network environment where the electronic device is located by scanning with the first channel; and
  control the electronic device to connect to the first target wireless access point.

17. The electronic device according to claim claim 14, wherein the processor further executes the computer-readable instructions to:
  determine a second target wireless access point in network environment where the electronic device is located by scanning with the second channel; and
  control the electronic device to connect to the second target wireless access point.

18. The electronic device according to claim 14, wherein the processor further executes the computer-readable instructions to:
  acquire first channel information based on the first preset rule;
  scan wireless access points in a network environment in which the electronic device is located with the first channel information to determine a first target wireless access point; and
  control the electronic device to connect to the first target wireless access point.

19. The electronic device according to claim 18, wherein historical connection information about the wireless access point to which the electronic device ever connected is stored in the electronic device;
  the first preset rule comprises: acquiring the first channel information based on the historical connection information; and
  the processor further executes the computer-readable instructions to:
  extract target channel information from the historical connection information about the wireless access point to which the electronic device ever connected as the first channel information.

20. The electronic device according to claim 18, wherein the first preset rule comprises: acquiring channel information about a channel with a channel frequency lower than a preset first threshold; and
  the processor further executes the computer-readable instructions to:
  acquire the channel information about the channel with the channel frequency lower than the preset first threshold as the first channel information.

21. The electronic device according to claim 18, wherein the processor further executes the computer-readable instructions to:
  acquire a first connection result about the electronic device connecting to the first target wireless access point after the processor further executes the computer-readable instructions to control the electronic device to connect to the first target wireless access point, and to control the electronic device to connect to the wireless access point corresponding to the first channel or the wireless access point corresponding to the second channel based on the second preset rule in the case that the first connection result indicates that the electronic device fails to connect to the first target wireless access point;
  acquire second channel information based on a second preset rule;
  scan the wireless access point in the network environment in which the electronic device is located with the second channel information to determine a second target wireless access point; and
  control the electronic device to connect to the second target wireless access point.

22. The electronic device according to claim 14, wherein historical connection information related to a wireless access point to which the electronic device ever connected is stored in the electronic device, and the processor further executes the computer-readable instructions to:
  judge whether a target wireless access point is a wireless access point to which the electronic device ever connected to obtain a first judging result in the case that the target wireless access point is found by the electronic device and a connection result signal sent from the target wireless access point indicates that a number of current connections to the target wireless access point reaches a preset connection limit; obtain historical connection information related to the target wireless access point in the electronic device to obtain a first address based on the historical connection information to control the electronic device to connect to the target wireless access point via the first address in the case that the first judging result indicates that the target wireless access point is the wireless access point to which the electronic device ever connected; and control the electronic device to connect to the target wireless access point via a second address based on information of a current address range allocated by the target wireless access point comprises in a connection result signal sent from the target wireless access point in the case that the first judging result indicates that the target wireless access point is not the wireless access point to which the electronic device ever connected.

23. The electronic device according to claim 22, wherein the processor further executes the computer-readable instructions to:
  parse the historical connection information to obtain a parsing result; and
  determine a historical connection address in the parsing result as the first address, wherein the electronic device ever connected to the target wireless access point via the historical connection address.

24. The electronic device according to claim 22, wherein the processor further executes the computer-readable instructions to:
  determine, based on the historical connection information, a historical connection address range allocated to the electronic device by the target wireless access point, wherein the historical connection address range comprises at least one connection address;

obtain, from a preset connection address set, at least one connection address different from any one connection address in the historical connection address range to form a first pre-selection set, wherein the preset connection address set comprises a plurality of connection addresses comprising all the connection addresses of the historical connection address range; and determine one connection address in the first pre-selection set as the first address.

25. The electronic device according to claim 24, wherein the processor further executes the computer-readable instructions to:

randomly select one connection address from the first pre-selection set as the first address; and a second selection module, configured to select one connection address with an address rank value meeting a preset address selecting rule from the first pre-selection set as the first address.

26. The electronic device according to claim 22, wherein the processor further executes the computer-readable instructions to:

extract a current connection address range allocated by the target wireless access point from the information of the current address range allocated by the target wireless access point in the connection result signal sent from the target wireless access point, wherein the current connection address range comprises at least one connection address;

obtain, from a preset connection address set, at least one connection address different from any one connection address in the current connection address range to form a second pre-selection set, wherein the preset connection address set comprises a plurality of connection addresses comprising all the connection addresses in the current connection address range;

determine one connection address in the second pre-selection set as the second address; and control the electronic device to connect to the target wireless access point using the second address.

* * * * *